United States Patent
Karc et al.

(10) Patent No.: US 10,687,409 B2
(45) Date of Patent: **\*Jun. 16, 2020**

(54) FACEPLATE REMOTE CONTROL DEVICE FOR USE IN A LOAD CONTROL SYSTEM

(71) Applicant: Lutron Technology Company LLC, Coopersburg, PA (US)

(72) Inventors: Jeffrey Karc, Danielsville, PA (US); Jamie Steffie, Slatington, PA (US); Jordan H. Crafts, Bethlehem, PA (US)

(73) Assignee: Lutron Technology Company LLC, Coopersburg, PA (US)

(\*) Notice: Subject to any disclaimer, the term of this patent is extended or adjusted under 35 U.S.C. 154(b) by 0 days.

This patent is subject to a terminal disclaimer.

(21) Appl. No.: 16/430,227

(22) Filed: Jun. 3, 2019

(65) Prior Publication Data

US 2019/0394861 A1 Dec. 26, 2019

Related U.S. Application Data

(60) Continuation of application No. 15/845,797, filed on Dec. 18, 2017, now Pat. No. 10,314,148, which is a (Continued)

(51) Int. Cl.
*H05B 37/02* (2006.01)
*H05B 47/19* (2020.01)
(Continued)

(52) U.S. Cl.
CPC .......... *H05B 47/19* (2020.01); *H05B 47/105* (2020.01); *H05B 47/175* (2020.01); *Y10T 307/937* (2015.04)

(58) Field of Classification Search
CPC .......... H05B 37/0272; H05B 37/0227; H05B 47/19; H05B 47/175; Y10T 307/937
(Continued)

(56) References Cited

U.S. PATENT DOCUMENTS 3,701,870 A    10/1972    Sorenson
4,365,237 A    12/1982    Knight
(Continued)

FOREIGN PATENT DOCUMENTS

EP    1524750 A2    4/2005
WO    WO9729560    8/1997
WO    WO2004077188    9/2004

OTHER PUBLICATIONS

"Where to find a remote power outlet switched on/off by another outlet?" Web blog Post. Ask Meta Filter. 1999-2017 MetaFilter Network Inc. Jan. 20, 2011 6:26 PM. http://ask.metafilter.com/176304/Where-to-find-a-remote-power-outlet-switched-onoff-by-another-outlet. Web Date Accessed Apr. 14, 2017.
(Continued)

*Primary Examiner* — Thuy V Tran
(74) *Attorney, Agent, or Firm* — Amy Yanek; Glen Farbanish; Philip Smith

(57) ABSTRACT

A faceplate remote control device may be attached to a wall-mounted mechanical light switch that has a toggle actuator. The faceplate remote control device may include a toggle indicator that detects operation of the toggle actuator of the mechanical switch. The toggle indicator may cause the generation of an indication of detected operation of the toggle actuator. The toggle indicator may comprise a sliding member that is configured to move with the toggle actuator. The toggle indicator may comprise an obstruction detection device that includes an infrared (IR) transmitter and an IR receiver. The faceplate remote control device may include a control circuit and a wireless communication circuit. The control circuit may be configured to cause the wireless communication circuit to transmit one or more messages in response to detecting operation of the toggle actuator of the mechanical switch.

15 Claims, 7 Drawing Sheets

Related U.S. Application Data division of application No. 14/576,983, filed on Dec. 19, 2014, now Pat. No. 9,848,479.

(60) Provisional application No. 61/920,865, filed on Dec. 26, 2013.

(51) Int. Cl.
    *H05B 47/105* (2020.01)
    *H05B 47/175* (2020.01)

(58) Field of Classification Search
    USPC .......... 200/237, 238, 341; 307/139; 341/176
    See application file for complete search history.

(56) References Cited

U.S. PATENT DOCUMENTS

| | | | |
|---|---|---|---|
| 4,378,525 A | 3/1983 | Burdick | |
| 4,498,650 A | 2/1985 | Smith et al. | |
| 4,563,592 A | 1/1986 | Yuhasz et al. | |
| 4,630,248 A | 12/1986 | Scott | |
| 4,889,999 A | 12/1989 | Rowen | |
| 4,972,457 A | 11/1990 | O'Sullivan | |
| 4,989,260 A | 1/1991 | Meade | |
| 5,109,200 A | 4/1992 | Dushane et al. | |
| 5,239,205 A * | 8/1993 | Hoffman | H01H 23/00 200/277.2 |
| 5,340,954 A | 8/1994 | Hoffman et al. | |
| 5,457,442 A | 10/1995 | Lucero | |
| 5,458,311 A | 10/1995 | Holbrook | |
| 5,818,128 A | 10/1998 | Hoffman et al. | |
| 5,831,395 A | 11/1998 | Mortimer et al. | |
| 5,895,985 A | 4/1999 | Fischer | |
| 5,905,442 A | 5/1999 | Mosebrook et al. | |
| 6,072,284 A | 6/2000 | Lin | |
| 6,211,626 B1 | 4/2001 | Lys et al. | |
| 6,320,506 B1 | 11/2001 | Ferraro | |
| 6,380,852 B1 | 4/2002 | Hartman et al. | |
| 6,528,954 B1 | 3/2003 | Lys et al. | |
| RE38,069 E | 4/2003 | Posa | |
| 6,546,873 B1 | 4/2003 | Andrejkovics et al. | |
| 6,650,322 B2 | 11/2003 | Dai et al. | |
| 6,803,728 B2 | 10/2004 | Balasubramaniam et al. | |
| 6,912,429 B1 | 6/2005 | Bilger | |
| 7,198,523 B2 | 4/2007 | Adams et al. | |
| 7,298,833 B2 | 11/2007 | Klein et al. | |
| 7,311,558 B2 | 12/2007 | Adams et al. | |
| 7,375,445 B1 | 5/2008 | Smith | |
| 7,411,489 B1 | 8/2008 | Elwell et al. | |
| 7,423,413 B2 | 9/2008 | Dobbins et al. | |
| 7,573,208 B2 | 8/2009 | Newman, Jr. | |
| 7,687,940 B2 | 3/2010 | Mosebrook et al. | |
| 7,772,724 B2 | 8/2010 | Mosebrook et al. | |
| 7,778,734 B2 | 8/2010 | Oswald et al. | |
| 7,800,319 B2 | 9/2010 | Raneri | |
| 7,847,440 B2 | 12/2010 | Mosebrook et al. | |
| 7,872,423 B2 | 1/2011 | Biery et al. | |
| 8,008,866 B2 | 8/2011 | Newman, Jr. et al. | |
| 8,009,042 B2 | 8/2011 | Steiner et al. | |
| 8,153,918 B2 | 4/2012 | Agronin et al. | |
| 8,199,010 B2 | 6/2012 | Sloan et al. | |
| 8,212,424 B2 | 7/2012 | Mosebrook et al. | |
| 8,212,425 B2 | 7/2012 | Mosebrook et al. | |
| 8,228,184 B2 | 7/2012 | Blakeley et al. | |
| 8,258,654 B2 | 9/2012 | Parsons | |
| 8,330,638 B2 | 12/2012 | Altonen et al. | |
| 8,410,706 B2 | 4/2013 | Steiner et al. | |
| 8,451,116 B2 | 5/2013 | Steiner et al. | |
| 8,639,391 B1 | 1/2014 | Alberth, Jr. et al. | |
| 8,723,447 B2 | 5/2014 | Steiner | |
| 8,760,293 B2 | 6/2014 | Steiner | |
| 8,853,950 B1 | 10/2014 | Chang | |
| 9,054,465 B2 | 6/2015 | Hodges | |
| 9,167,669 B2 | 10/2015 | Karc et al. | |
| 9,208,965 B2 | 12/2015 | Busby et al. | |
| 9,252,595 B2 | 2/2016 | Recker et al. | |
| 9,337,663 B2 | 5/2016 | Alberth, Jr. et al. | |
| 9,374,424 B2 | 6/2016 | Cheong et al. | |
| 9,538,619 B2 | 1/2017 | Swatsky et al. | |
| 9,553,451 B2 | 1/2017 | Zacharchuk et al. | |
| 9,699,871 B2 | 7/2017 | Karc et al. | |
| 9,702,514 B1 | 7/2017 | Colby | |
| 9,736,914 B2 | 8/2017 | Pakkala et al. | |
| 9,826,604 B2 | 11/2017 | Karc et al. | |
| 9,848,479 B2 | 12/2017 | Karc et al. | |
| 10,143,071 B2 | 11/2018 | Karc et al. | |
| 10,314,148 B2 | 6/2019 | Karc et al. | |
| 10,317,923 B2 | 6/2019 | Karc et al. | |
| 2002/0000911 A1 | 1/2002 | Hilleary | |
| 2002/0047646 A1 | 4/2002 | Lys et al. | |
| 2002/0105285 A1 | 8/2002 | Loughrey | |
| 2002/0180367 A1 | 12/2002 | Logan | |
| 2003/0011538 A1 | 1/2003 | Lys et al. | |
| 2004/0133314 A1 | 7/2004 | Ehlers et al. | |
| 2004/0155609 A1 | 8/2004 | Lys et al. | |
| 2005/0030192 A1 | 2/2005 | Weaver et al. | |
| 2005/0162282 A1 | 7/2005 | Dresti et al. | |
| 2006/0028997 A1 | 2/2006 | McFarland | |
| 2006/0072726 A1 | 4/2006 | Klein et al. | |
| 2007/0007898 A1 | 1/2007 | Bruning | |
| 2007/0043477 A1 | 2/2007 | Ehlers et al. | |
| 2007/0045431 A1 | 3/2007 | Chapman et al. | |
| 2007/0061050 A1 | 3/2007 | Hoffknecht | |
| 2007/0146126 A1 | 6/2007 | Wang | |
| 2007/0217211 A1 | 9/2007 | Hewson | |
| 2007/0233323 A1 | 10/2007 | Wiemeyer et al. | |
| 2007/0241615 A1 | 10/2007 | Goodrich | |
| 2007/0250189 A1 | 10/2007 | Rourke et al. | |
| 2008/0024674 A1 | 1/2008 | Park | |
| 2008/0083234 A1 | 4/2008 | Krebs et al. | |
| 2008/0120578 A1 | 5/2008 | Wang et al. | |
| 2008/0183316 A1 | 7/2008 | Clayton | |
| 2008/0281472 A1 | 11/2008 | Podgorny et al. | |
| 2008/0283621 A1 | 11/2008 | Quirino et al. | |
| 2009/0039854 A1 | 2/2009 | Blakeley | |
| 2009/0052859 A1 | 2/2009 | Greenberger et al. | |
| 2009/0093234 A1 | 4/2009 | Cai et al. | |
| 2009/0108765 A1 | 4/2009 | Weightman et al. | |
| 2009/0141522 A1 | 6/2009 | Adest et al. | |
| 2009/0192927 A1 | 7/2009 | Berg et al. | |
| 2009/0195192 A1 | 8/2009 | Joseph | |
| 2009/0195349 A1 | 8/2009 | Frader-Thompson et al. | |
| 2009/0206983 A1 | 8/2009 | Knode et al. | |
| 2009/0284169 A1 | 11/2009 | Valois | |
| 2009/0299504 A1 | 12/2009 | Kumazawa et al. | |
| 2010/0026479 A1 | 2/2010 | Tran | |
| 2010/0052894 A1 | 3/2010 | Steiner et al. | |
| 2010/0076615 A1 | 3/2010 | Daniel et al. | |
| 2010/0141153 A1 | 6/2010 | Recker et al. | |
| 2010/0148983 A1 | 6/2010 | Huxley et al. | |
| 2010/0161706 A1 | 6/2010 | Kim et al. | |
| 2010/0164299 A1 | 7/2010 | Lee et al. | |
| 2010/0171430 A1 | 7/2010 | Seydoux | |
| 2010/0176661 A1 | 7/2010 | Wilson | |
| 2010/0188229 A1 | 7/2010 | Nhep | |
| 2010/0207759 A1 | 8/2010 | Sloan et al. | |
| 2010/0244706 A1 | 9/2010 | Steiner et al. | |
| 2010/0244709 A1 | 9/2010 | Steiner et al. | |
| 2010/0256823 A1 | 10/2010 | Cherukuri et al. | |
| 2010/0270982 A1 | 10/2010 | Hausman, Jr. et al. | |
| 2010/0280667 A1 | 11/2010 | Steinberg | |
| 2010/0289430 A1 | 11/2010 | Stelzer et al. | |
| 2010/0327766 A1 | 12/2010 | Recker et al. | |
| 2011/0012433 A1 | 1/2011 | Parsons | |
| 2011/0031806 A1 | 2/2011 | Altonen et al. | |
| 2011/0083948 A1 | 4/2011 | Mahle | |
| 2011/0121654 A1 | 5/2011 | Recker et al. | |
| 2011/0162946 A1 | 7/2011 | Altonen | |
| 2011/0163600 A1 | 7/2011 | Garb et al. | |
| 2011/0267802 A1 | 11/2011 | Petrillo | |
| 2011/0279300 A1 | 11/2011 | Mosebrook | |
| 2011/0313560 A1 | 12/2011 | Hangaard et al. | |
| 2012/0001488 A1 | 1/2012 | Puschnigg | |
| 2012/0026726 A1 | 2/2012 | Recker et al. | |

(56) References Cited

U.S. PATENT DOCUMENTS

| | | |
|---|---|---|
| 2012/0043889 A1 | 2/2012 | Recker et al. |
| 2012/0049800 A1 | 3/2012 | Johnson et al. |
| 2012/0066168 A1 | 3/2012 | Fadell et al. |
| 2012/0080944 A1 | 4/2012 | Recker et al. |
| 2012/0086272 A1 | 4/2012 | Chen et al. |
| 2012/0091213 A1 | 4/2012 | Altonen et al. |
| 2012/0112666 A1 | 5/2012 | Bennette |
| 2012/0139446 A1 | 6/2012 | Koren et al. |
| 2012/0146538 A1 | 6/2012 | Nerone |
| 2012/0278640 A1 | 11/2012 | Caglianone |
| 2012/0286676 A1 | 11/2012 | Saveri, III et al. |
| 2012/0286689 A1 | 11/2012 | Newman, Jr. et al. |
| 2012/0286940 A1 | 11/2012 | Carmen, Jr. et al. |
| 2012/0293153 A1 | 11/2012 | Garb et al. |
| 2012/0313535 A1 | 12/2012 | Bedell et al. |
| 2013/0013091 A1 | 1/2013 | Cavalcanti et al. |
| 2013/0030589 A1 | 1/2013 | Pessina et al. |
| 2013/0030732 A1 | 1/2013 | Shetty et al. |
| 2013/0214609 A1 | 8/2013 | Carmen, Jr. |
| 2013/0234625 A1 | 9/2013 | Kondo et al. |
| 2013/0282067 A1 | 10/2013 | Van Hulle et al. |
| 2014/0015423 A1 | 1/2014 | Williams |
| 2014/0049164 A1 | 2/2014 | McGuire et al. |
| 2014/0081474 A1 | 3/2014 | Blakeley et al. |
| 2014/0117871 A1 | 5/2014 | Swatsky et al. |
| 2014/0125150 A1 | 5/2014 | Alberth et al. |
| 2014/0142724 A1 | 5/2014 | Park et al. |
| 2014/0148923 A1 | 5/2014 | Yamada et al. |
| 2014/0180486 A1 | 6/2014 | Newman, Jr. et al. |
| 2014/0191573 A1 | 7/2014 | Chen et al. |
| 2014/0244040 A1 | 8/2014 | Alberth, Jr. et al. |
| 2014/0265577 A1 | 9/2014 | Beckman |
| 2014/0265881 A1 | 9/2014 | Karc et al. |
| 2014/0265918 A1 | 9/2014 | Cummings |
| 2014/0327369 A1 | 11/2014 | Wendt |
| 2014/0353135 A1 | 12/2014 | Erdmann et al. |
| 2015/0005900 A1 | 1/2015 | Steele et al. |
| 2015/0054341 A1 | 2/2015 | Holder et al. |
| 2015/0054410 A1 | 2/2015 | Sanders et al. |
| 2015/0061497 A1 | 3/2015 | Martins et al. |
| 2015/0088287 A1 | 3/2015 | Nagamatsu et al. |
| 2015/0130276 A1 | 5/2015 | McNeill-McCallum et al. |
| 2015/0137692 A1 | 5/2015 | Newman, Jr. et al. |
| 2015/0145428 A1 | 5/2015 | Gergely et al. |
| 2015/0145501 A1 | 5/2015 | Ware |
| 2015/0185751 A1 | 7/2015 | Karc et al. |
| 2015/0189721 A1 | 7/2015 | Karc et al. |
| 2015/0189725 A1 | 7/2015 | Karc et al. |
| 2015/0249337 A1 | 9/2015 | Spira et al. |
| 2016/0041573 A1 | 2/2016 | Chen et al. |
| 2016/0065004 A1 | 3/2016 | Hartman et al. |
| 2016/0192458 A1 | 6/2016 | Keith |
| 2016/0205745 A1 | 7/2016 | Saveri, III et al. |
| 2016/0290616 A1 | 10/2016 | Pantaleo |
| 2017/0085070 A1 | 3/2017 | AbuGhazaleh |
| 2017/0194789 A1 | 7/2017 | Chen et al. |
| 2018/0035520 A1 | 2/2018 | Karc et al. |
| 2019/0098735 A1 | 3/2019 | Karc et al. |
| 2020/0033902 A1 | 1/2020 | Karc et al. |

OTHER PUBLICATIONS

Cree, "Cree Reinvents the Three-Way LED Bulb", Available at http://www.cree.com/News-and-Events/Cree-News/Press-Releases/2014/June/3way-bulb, Jun. 4, 2014, 1 page.

Hunterdouglas, "Introduction to the PlatinumTM RF Adapter", 2011, 2 pages.

Hunterdouglas, "Platinum Technology Accessories", 2011, 4 pages.

Machine Translation of EP1524750A2 (Year: 2005).

Farivar, Cyrus, "Shake, Rattle and Roll: How We Got a Washing Machine to Text When it's Done", Available at http://arstechnica.com/information-technology/2012/11/shake-rattle-and-roll-how-we-got-a-washing-machine-to-text-when-its-done/?comments=1, Nov. 25, 2012, pp. 1-12.

International Search Report and Written Opinion, International Application No. PCT/US16/20708; International Filing date May 3, 2016; dated May 17, 2016.

* cited by examiner

FACEPLATE REMOTE CONTROL DEVICE FOR USE IN A LOAD CONTROL SYSTEM

CROSS-REFERENCE TO RELATED APPLICATIONS

This application is a continuation of U.S. patent application Ser. No. 15/845,797, filed Dec. 18, 2017 (now U.S. Pat. No. 10,314,148, issued Jun. 4, 2019), which is a divisional of U.S. patent application Ser. No. 14/576,983, filed Dec. 19, 2014, entitled FACEPLATE REMOTE CONTROL DEVICE FOR USE IN A LOAD CONTROL SYSTEM (now U.S. Pat. No. 9,848,479), which claims priority to U.S. Provisional Patent Application Ser. No. 61/920,865, filed Dec. 26, 2013, each of which is incorporated herein by reference in its entirety.

BACKGROUND

Electrical loads, such as lamps, ceiling lighting fixtures, thermostats, shades, etc., may be controlled using load control devices. A load control device may be configured for wireless communication. For instance, a dimmer switch may be configured as a radio-frequency (RF) dimmer switch. Such a load control device may be associated with one or more devices in a load control system, such as a lighting control system. A load control device that participates in a load control system may receive wirelessly communicated messages (e.g., including commands) from one or more other devices of the load control system. The messages may cause the load control device to adjust the amount of power delivered to one or more electrical loads that are connected to the load control device.

FIG. 1 depicts an example prior art lighting control system 10 that includes a tabletop RF dimmer switch 20 and a lamp 30 that is plugged into the dimmer switch 20, such that the dimmer switch 20 may be operated to control the amount of power delivered to the lamp 30. The dimmer switch 20 may be electrically connected to an electrical circuit that includes an alternating-current (AC) power source 40 and an AC outlet 42 that is electrically connected to the AC power source 40. The AC outlet 42 includes an upper switched receptacle 41 and a lower unswitched receptacle 43. The electrical circuit further includes a wall-mounted light switch 46 that is mounted in an electrical wallbox and is coupled in series electrical connection between the AC power source 40 and the upper switched receptacle 41. The lamp 30 may be controlled by the wall-mounted switch 46. The dimmer switch 20 includes a plug 22 that is plugged into the switched receptacle 41. The lamp 30 includes a plug 32 that is plugged into the plug 22 of the dimmer switch 20, such that the delivery of AC power to the lamp 30 may be controlled by operating a toggle actuator (not shown) of the wall-mounted switch 46 to open and close the switch.

The lighting control system 10 may further include one or more devices that are configured to wirelessly communicate with the dimmer switch 20. As shown, the lighting control system 10 includes an occupancy and/or vacancy sensor 50, a daylight sensor 60, and a remote control device 70, such as a remote keypad. One or more of the occupancy and/or vacancy sensor 50, the daylight sensor 60, and the remote control device 70 may wirelessly communicate with the dimmer switch 20 via RF signals 90, for example to command the dimmer switch 20 to adjust the amount of AC power that is provided to the lamp 30.

Control of the illustrated lighting control system 10 may be compromised when power is removed from the upper switched receptacle 41 of the outlet 42. For instance, when the wall switch 46 is turned off, a wireless communication component of the dimmer switch 20, such as a receiver, may be unpowered and thus unable to receive wirelessly communicated commands. This may undesirably render the dimmer switch 20 unresponsive to wirelessly communicated commands from the occupancy and/or vacancy sensor 50, the daylight sensor 60, and the remote control 70, such as commands to turn on, turn off, or dim the lamp 30.

Plugging the dimmer switch 20 into the lower unswitched receptacle 43 of the outlet 42 may ensure continuous power of the wireless communication component of the dimmer switch 20, but would remove the ability to switch power to the lamp 30 using the wall-mounted switch 46. This may be undesirable to a user of the lighting control system 10. A user of the lighting control system 10 may prefer to be able to switch power to the lamp 30 via the wall-mounted switch 46, while ensuring that the lamp 30 remains controllable by the dimmer switch 20, for instance via one or more of the occupancy and/or vacancy sensor 50, the daylight sensor 60, and the remote control 70.

Moreover, a user of the lighting control system 10 may be undesirably constrained from relocating the dimmer switch 20 and/or the lamp 30. For example, if the user desires to move the dimmer switch 20 and the lamp 30 to a location wherefrom the electrical cord of the dimmer switch 20 will not reach the upper switched receptacle 41 of the outlet 42, the user may be forced to plug the dimmer switch 20 into an unswitched outlet, such that the ability to switch the lamp 30 is lost, or may be forced to connect the dimmer switch 20 to the upper switched receptacle 41 using an extension cord, which may be impractical and/or aesthetically unpleasing.

SUMMARY

As described herein, a faceplate remote control device may be configured to be attached to a wall-mounted mechanical light switch that has a toggle actuator. The faceplate remote control device may include a housing that defines an opening that permits the toggle actuator of the light switch to protrude through the opening, such that the toggle actuator is operable when the faceplate remote control device is attached to the mechanical light switch.

The faceplate remote control device may be configured to detect operation of the toggle actuator of the mechanical switch, for example operation of the mechanical switch from a first position to a second position. The faceplate remote control device may include a toggle indicator that is configured to detect operation of the toggle actuator of the mechanical switch. The toggle indicator may cause the generation of an indication that operation of the toggle actuator is detected.

The toggle indicator may comprise a sliding member that is configured to move with the toggle actuator of the mechanical switch when the toggle actuator is operated. The sliding member may include an electrically-conductive wiper that is configured to abut a conductive pad when the toggle actuator is operated. Contact between the electrically-conductive wiper and the conductive pad may cause the conductive pad to generate an indication of operation of the toggle actuator.

The toggle indicator may comprise an obstruction detection device that includes an infrared (IR) transmitter and an IR receiver. The IR transmitter may generate an IR beam that is received at the IR receiver when the toggle actuator is in a first position. When the toggle actuator is operated, the IR beam may be obstructed, such that reception of the IR beam by the IR receiver is interrupted. The IR receiver may generate a control signal that is representative of whether the IR beam is received, and thus representative of the position of the toggle actuator. The control signal may comprise an indication of when the toggle actuator is operated.

The faceplate remote control device may include a control circuit and a wireless communication circuit. The control circuit may be configured to cause the wireless communication circuit to transmit one or more messages in response to detecting operation of the toggle actuator of the mechanical switch. The one or more messages may be transmitted to one or more devices, such as a load control device, that are associated with the faceplate remote control device in a lighting control system. The one or more messages may include a command, such as a command that causes a load control device that is associated with the faceplate remote control device to adjust the intensity of a lighting load that is controlled by the load control device. The one or more messages may include, for example, a change of state signal.

DETAILED DESCRIPTION

Figure 1:
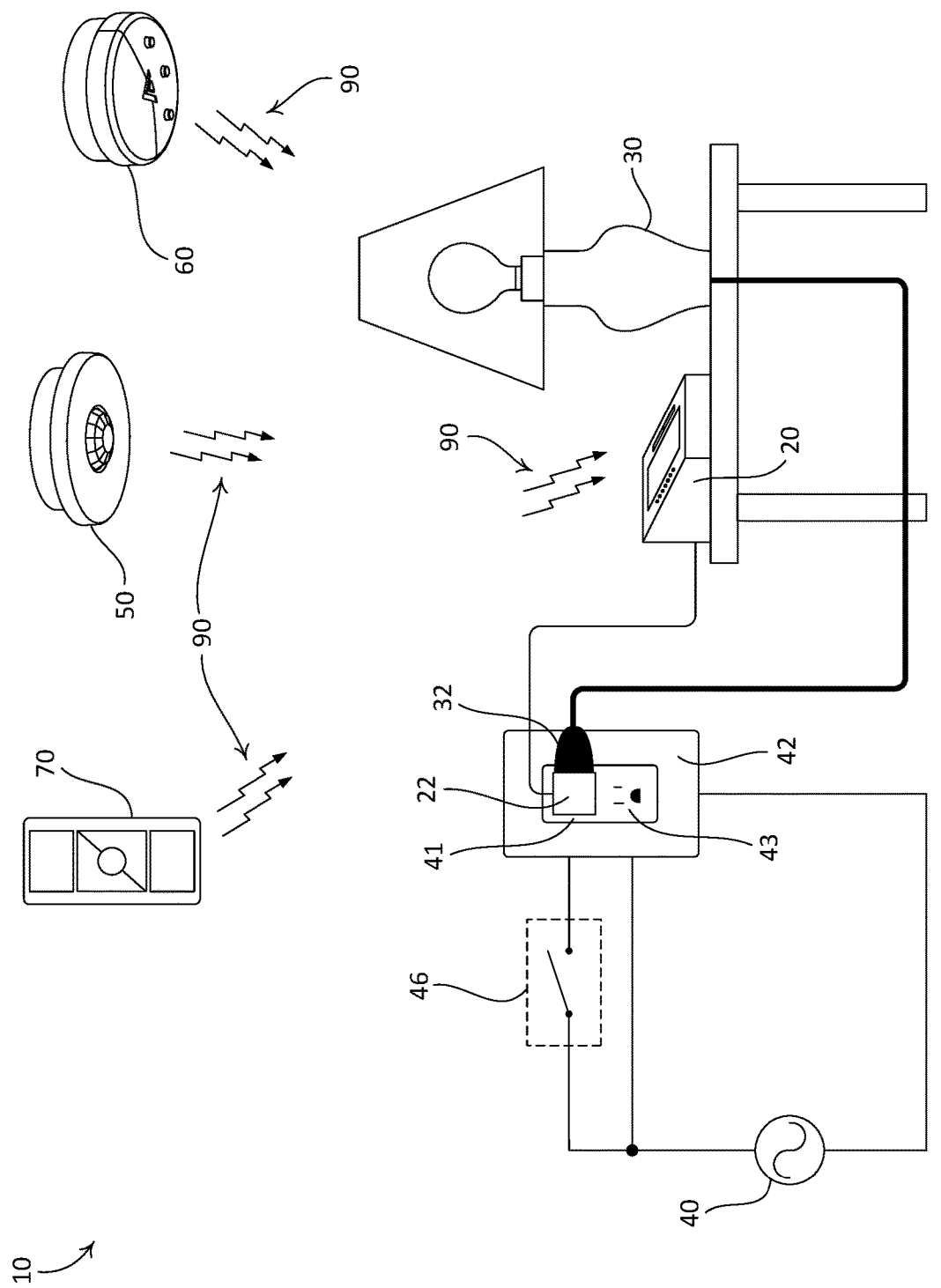
FIG. 1 depicts a prior art lighting control system.
Figure 2:
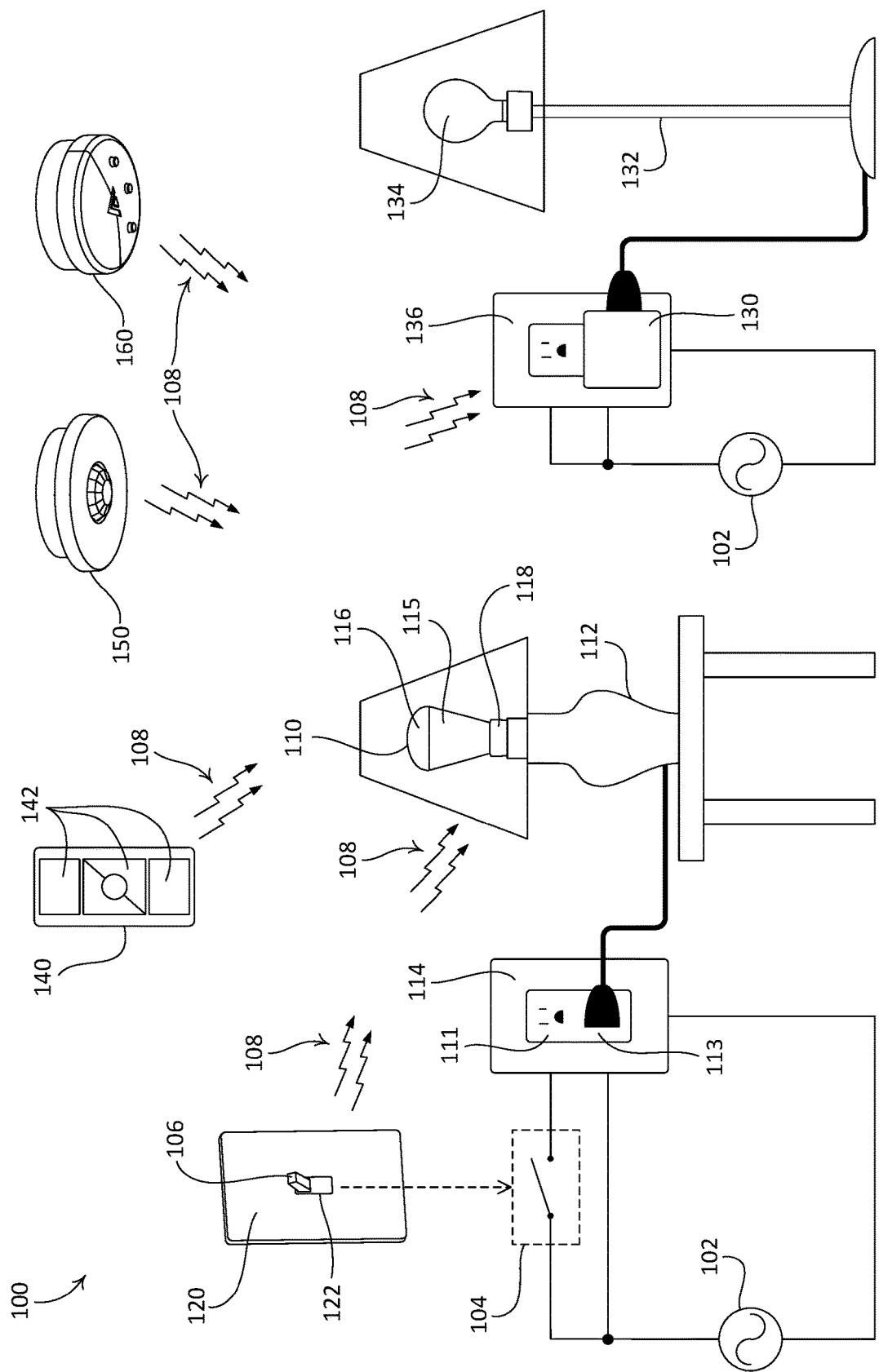
FIG. 2 depicts an example lighting control system that includes an example faceplate remote control device.

FIG. 2 depicts an example load control system that is configured as a lighting control system 100. The lighting control system 100 may include various components that are associated with each other, and that are configured to communicate with one another, for instance via wireless communication. The components of the lighting control system 100 may include, for example one or more load control devices, one or more electrical loads that are controlled via the one or more load control devices, one or more control devices (e.g., remote control devices) that are configured to control the load control devices, and/or one or more sensors that are configured to provide inputs (e.g., sensor readings) to the one or more load control devices.

As shown, the lighting control system 100 includes a controllable light source 110 and a faceplate remote control device 120 that may be configured to control the controllable light source 110. The controllable light source 110 may include an integral lighting load (not shown) and an integral load regulation circuit (not shown). The controllable light source 110 and the faceplate remote control device 120 may include respective wireless communication circuits. For example, the controllable light source 110 may include a radio-frequency (RF) transmitter, and the faceplate remote control device 120 may include an RF transceiver. The faceplate remote control device 120 and the controllable light source 110 may be associated with one another, for example during a configuration procedure of the lighting control system 100, such that the controllable light source 110 may be configured to respond to one or more messages transmitted by the faceplate remote control device 120.

As shown, the controllable light source 110 may be installed in a table lamp 112. The table lamp 112 may be plugged into a first electrical outlet 114 that has an upper switched receptacle 111 and a lower unswitched receptacle 113. The lower unswitched receptacle 113 may be directly coupled to an AC power source 102, and the upper switched receptacle 111 may be coupled to the AC power source 102 through a standard wall-mounted mechanical switch 104 (e.g., a toggle switch or a standard light switch). The mechanical switch 104 may include a toggle actuator 106. The mechanical switch 104 may be opened and closed in response to actuations of (e.g., operation of) the toggle actuator 106. The mechanical switch 104 may comprise, for example, a maintained single-pole mechanical switch. The table lamp 112 may be plugged into the lower unswitched receptacle 113 of the electrical outlet 114, such that the controllable light source 110 may be continuously powered from the AC power source 102. The faceplate remote control device 120 may be operated to control the controllable light source 110, without the need to plug the table lamp 112 into the upper switched receptacle 111 of the electrical outlet 114.

The faceplate remote control device 120 may be configured to be attached to (e.g., mounted to) the mechanical switch 104. For example, the faceplate remote control device 120 may be attached to the mechanical switch 104 in place of a standard faceplate or wall plate. In this regard, the faceplate remote control device 120 may replace a standard faceplate or wall plate that was previously attached to the mechanical switch 104. The faceplate remote control device 120 may define an opening 122 through which the toggle actuator 106 of the mechanical switch 104 may protrude. As shown, the opening 122 may be configured to permit the toggle actuator 106 to protrude through the opening 122 such that the toggle actuator 106 is operable, for example by a user of the lighting control system 100, and in particular a user of the faceplate remote control device 120.

As shown, the controllable light source 110 includes a housing 115 (e.g., a glass housing) that defines a front surface 116. The integral lighting load may be located within the housing 115 (e.g., surrounded by the housing 115), and may be configured such that light generated by the integral lighting load shines out of the front surface 116 and/or the sides of the housing 115. The front surface 116 of the housing 115 may be transparent or translucent, and may be dome shaped as shown, or flat. The integral lighting load of the controllable light source 110 may comprise, for example, an incandescent lamp, a halogen lamp, a compact fluorescent lamp, a light-emitting diode (LED) light engine, or other suitable light source.

The illustrated controllable light source 110 may also include an enclosure portion 118 to which the housing 115 may be attached, and a screw-in base (not shown) that may be attached to the enclosure portion 118. The screw-in base may be configured to be screwed into a standard Edison socket, such that the controllable light source 110 is placed in electrical communication with (e.g., is electrically connected to) the AC power source 102. Examples of screw-in luminaires are described in greater detail in commonly assigned U.S. Pat. No. 8,008,866, issued Aug. 30, 2011, entitled "Hybrid Light Source," U.S. patent application publication no. 2012/0286689, published Nov. 15, 2012, entitled "Dimmable Screw-In Compact Fluorescent Lamp Having Integral Electronic Ballast Circuit," and U.S. patent application Ser. No. 13/829,834, filed Mar. 14, 2013, entitled "Controllable Light Source," the entire disclosures of which are incorporated herein by reference.

The integral load regulation circuit of the controllable light source 110 may be located within (e.g., housed inside) the enclosure portion 118. The integral load regulation circuit may comprise, for example, a dimmer circuit, a ballast circuit, or an LED driver circuit, for controlling the intensity of the integral lighting load between a low-end intensity (e.g., approximately 1%) and a high-end intensity (e.g., approximately 100%). The controllable light source 110 may further include a control circuit (e.g., a microprocessor) and a wireless communication circuit (e.g., comprising an RF receiver) that may be housed inside the enclosure portion 118. The control circuit may be configured to control the integral lighting load (e.g., via the integral load regulation circuit) in response to one or more messages that are received by the wireless communication circuit (e.g., via RF signals 108), such as messages received from the faceplate remote control device 120.

The faceplate remote control device 120 may be configured to operate as a state change device. For example, the faceplate remote control device 120 may be configured to transmit one or more messages (e.g., digital messages) via wireless communication (e.g., via RF signals 108) in response to actuations of the toggle actuator 106 of the mechanical switch 104. The one or more messages may be indicative of a change of state within the lighting control system 100. For example, one or more messages may be indicative of a change of state of the toggle actuator 106 of the mechanical switch 104. Such messages may be referred to as change of state messages, or as change of state signals, and may be interpreted by one or more devices that are associated with the faceplate remote control device 120, such as the controllable light source 110, as indications (e.g., commands) to turn on, turn off, dim, etc. respective lighting loads. For example, the controllable light source 110 may cause the integral lighting load to turn on or off, or may cause the integral load regulation circuit to adjust an intensity of the integral lighting load, in response to the receipt of one or more messages transmitted by the faceplate remote control device 120 (e.g., via RF signals 108). The one or more messages may be transmitted by the faceplate remote control device 120 in response to operation of the toggle actuator 106 of the mechanical switch 104.

The lighting control system 100 may further include another load control device. For example, as shown, the lighting control system 100 further includes a plug-in load control device 130. The plug-in load control device 130 is plugged into a second electrical outlet 136 that has two unswitched receptacles that are in electrical communication with the AC power source 102. The lighting control system 100 further includes a floor lamp 132. A standard light bulb 134 is installed in the floor lamp 132. The floor lamp 132 is plugged into the plug-in load control device 130, such that the plug-in load control device 130 may be operated to adjust the intensity of the light bulb 134 between a low end intensity (e.g., approximately 1%) and a high-end intensity (e.g., approximately 100%).

The plug-in load control device 130 may be associated with, and may be controlled by, the faceplate remote control device 120. For example, the plug-in load control device 130 may cause the light bulb 134 to turn on or off, or may adjust an intensity of the light bulb 134, in response to the receipt of one or more messages transmitted by the faceplate remote control device 120 (e.g., via RF signals 108). This may allow the intensity of the light bulb 134 to be synchronized with that of the controllable light source 110, for example. The plug-in load control device 130 may include one or more buttons (not shown) that are configured to provide local control of the plug-in load control device 130, for example to allow adjustment of the intensity of the light bulb 134. Alternatively, the plug-in load control device 130 may be a tabletop load control device or a wall-mounted dimmer switch.

The lighting control system 100 may further include a battery-powered handheld remote control device 140 that includes a plurality of buttons 142. The handheld remote control device 140 may be configured to be mounted vertically to a wall, or to be supported on a pedestal that may be mounted on a tabletop. The handheld remote control device 140 may transmit one or more messages (e.g., via RF signals 108) in response to operation of one or more of the buttons 142. Examples of battery powered remote control devices are described in greater detail in commonly assigned U.S. Pat. No. 7,573,208, issued Aug. 22, 2009, entitled "Method Of Programming A Lighting Preset From A Radio-Frequency Remote Control," and U.S. Pat. No. 8,330,638, issued Dec. 11, 2012, entitled "Wireless Battery Powered Remote Control Having Multiple Mounting Means," the entire disclosures of which are incorporated herein by reference.

One or both of the controllable light source 110 and the plug-in load control device 130 may be configured to control the intensities of corresponding lighting loads (e.g., the integral lighting load and the light bulb 134, respectively) in response to one or more messages received by the controllable light source 110 and the plug-in load control device 130, for instance via RF signals 108. Because the table lamp 112 is plugged into the lower unswitched receptacle 113 of the electrical outlet 114 as shown in FIG. 2, the controllable light source 110 may adjust the intensity of the integral lighting load independent of the position of the mechanical switch 104. Accordingly, the state of the controllable light source 110 (e.g., on or off) may be independent of a current position (e.g., closed or open) of the mechanical switch 104.

The lighting control system 100 may further include one or more occupancy sensors 150 that are configured to detect occupancy and/or vacancy conditions in a space in which the lighting control system 100 is installed. Such an occupancy sensor 150 may transmit one or more messages (e.g., via RF signals 108) to the controllable light source 110 and/or to the plug-in load control device 130, in response to detecting the occupancy and/or vacancy conditions. Alternatively, the occupancy sensor 150 may operate as a vacancy sensor to turn off one or more lighting loads in response to detecting a vacancy condition (e.g., to not turn on the one or more lighting loads in response to detecting an occupancy condition). Examples of RF load control systems having occupancy and vacancy sensors are described in greater detail in commonly assigned U.S. Pat. No. 8,009,042, issued Aug. 30, 2011 Sep. 3, 2008, entitled "Radio Frequency Lighting Control System With Occupancy Sensing," U.S. Pat. No. 8,199,010, issued Jun. 12, 2012, entitled "Method And Apparatus For Configuring A Wireless Sensor," and U.S. Pat. No. 8,228,184, issued Jul. 24, 2012, entitled "Battery Powered Occupancy Sensor," the entire disclosures of which are incorporated herein by reference.

The lighting control system 100 may further include one or more remote daylight sensors 160 that are configured to measure a total light intensity in a space in which the lighting control system 100 is installed. Such a daylight sensor 160 may transmit one or more messages (e.g., via RF signals 108) to the controllable light source 110 and/or to the plug-in load control device 130. The one or more messages may include a measured light intensity, and may cause the controllable light source 110 and/or the plug-in load control device 130 to adjust the intensities of corresponding lighting loads (e.g., the integral lighting load and the light bulb 134, respectively) in response to the measured light intensity. Examples of RF load control systems having daylight sensors are described in greater detail in commonly assigned U.S. Pat. No. 8,410,706, issued Apr. 2, 2013, entitled "Method Of Calibrating A Daylight Sensor," and U.S. Pat. No. 8,451,116, issued May 28, 2013, entitled "Wireless Battery-Powered Daylight Sensor," the entire disclosures of which are incorporated herein by reference.

In accordance with the illustrated lighting control system 100, the faceplate remote control device 120, the handheld remote control device 140, the occupancy sensor 150, and the daylight sensor 160 may operate as control-source devices (e.g., RF transmitters), and the controllable light source 110 and the plug-in load control device 130 may operate as control-target devices (e.g., RF receivers). It should be appreciated, however, that one or more of the control devices of the lighting control system 100 (e.g., all of the control devices) may comprise an RF transceiver, such that the control devices may be configured to both transmit and receive RF signals 108. Examples of RF load control systems are described in commonly-assigned U.S. Pat. No. 5,905,442, issued on May 18, 1999, entitled "Method And Apparatus For Controlling And Determining The Status Of Electrical Devices From Remote Locations," and U.S. patent application Ser. No. 12/033,223, filed Feb. 19, 2008, entitled "Communication Protocol For A Radio Frequency Load Control System," the entire disclosures of which are incorporated herein by reference.

One of the load control devices (e.g., the controllable light source 110 or the plug-in load control device 130) may be configured to operate as a control entity, such as a master device, within the lighting control system 100. The master device may operate to at least partially control functionality of the other load control devices of the lighting control system 100. The other load control devices of the lighting control system 100 may be configured to assume subservient roles to the master device (e.g., to operate as "slave" devices), such that the subservient devices will perform commands issued by the master device. It should be appreciated that if the lighting control system 100 includes only one load control device, the lighting control system 100 may not include a master device. One of the load control devices may be designated as the master device, for example by a user of the lighting control system 100. Alternatively, one of the load control devices may assume the role of the master device. For example, upon association with the lighting control system 100, a load control device may poll the other load control devices of the load control system, for example via broadcast, to determine if the lighting control system 100 currently has a master device. If the polling load control device does not receive an answer that another device of the lighting control system 100 is the master device, the polling load control device may assume the role of the master device in the lighting control system 100.

The master device may be configured to observe and/or record present state information pertaining to one or more subservient load control devices of the lighting control system 100. In an illustrative example, with reference to the lighting control system 100 shown in FIG. 2, the plug-in load control device 130 may assume the role of the master device, and the controllable light source 110 may assume a subservient role to the plug-in load control device 130, such that the plug-in load control device 130 is able to at least partially control operation of the controllable light source 110. The plug-in load control device 130 may observe and/or record present state information, for example last known state information, pertaining to the controllable light source 110 (e.g., whether the integral lighting load of the controllable light source 110 is on or off).

The plug-in load control device 130, in the role of the master device in the lighting control system 100, may be configured such that if at least one lighting load, for example the light bulb 134 or the integral lighting load of the controllable light source 110, is in an on state when the faceplate remote control device 120 transmits one or more change of state messages, the plug-in load control device 130 may cause one or more other lighting loads of the lighting control system 100 (e.g., each of the other lighting loads) to be operated from the on state to the off state, or left in the off state. For example, if the light bulb 134 is off and the integral lighting load of the controllable light source 110 is on when the toggle actuator 106 is operated, the faceplate remote control device 120 may transmit one or more change of state messages (e.g., via RF signals 108) that may be received by the controllable light source 110 and the plug-in load control device 130. The controllable light source 110 may ignore the one or more change of state messages from the faceplate remote control device 120, for example in accordance with the subservient role the controllable light source 110 has with respect to the plug-in load control device 130. When the one or more change of state messages are received by the plug-in load control device 130, the plug-in load control device 130 may not change the state of the light bulb 134, and may forward the one or more change of state messages to the controllable light source 110. Alternatively, the plug-in load control device 130 may reference the last known state information pertaining to the controllable light source 110, and may transmit an appropriate message (e.g., a command) to the controllable light source 110, for example a command that causes the controllable light source 110 to turn the integral lighting load off. The controllable light source 110, upon receipt of the forwarded change of message or the command, may change the state of the integral lighting load from on to off.

Alternatively, the plug-in load control device 130, in the role of the master device in the lighting control system 100, may be configured to maintain synchronization of the lighting loads of the lighting control system 100. For example, if the state of the light bulb 134 is changed locally at the plug-in load control device 130, the plug-in load control device 130 may transmit one or more messages (e.g., including a command) to the controllable light source 110 that cause the controllable light source 110 to change the state of the integral lighting load, thus keeping the states of the lighting loads of the lighting control system 100 synchronized to one another. If the state of the integral lighting load is changed locally at the controllable light source 110, the plug-in load control device 130 may change the state of the light bulb 134, thus keeping the states of the lighting loads of the lighting control system 100 synchronized to one another.

When the toggle actuator 106 of the mechanical switch 104 is actuated, the faceplate remote control device 120 may transmit one or more change of state messages that may be received by the controllable light source 110 and/or by the plug-in load control device 130. The controllable light source 110 may ignore the one or more change of state messages from the faceplate remote control device 120, for example in accordance with the subservient role the controllable light source 110 has with respect to the plug-in load control device 130. When the one or more change of state messages are received by the plug-in load control device 130, the plug-in load control device 130 may change the state of the light bulb 134, for example from on to off or from off to on, and may forward the one or more change of state messages to the controllable light source 110. Alternatively, the plug-in load control device 130 may transmit one or more messages (e.g., including a command) to the controllable light source 110, for example to cause the controllable light source 110 to turn the integral lighting load on or off. The controllable light source 110, upon receipt of the forwarded change of message or the one or more command messages, may change the state of the integral lighting load, for example from on to off or from off to on, such that synchronization of the lighting loads of the lighting control system 100 is maintained.

The role of the master device in a load control system in which the faceplate remote control device 120 is deployed, for instance the lighting control system 100, need not be fulfilled by a load control device of the load control system, such as the controllable light source 110 or the plug-in load control device 130. Such a load control system may include another device that is configured to fulfill the role of master device, for example a central controller, a main repeater, or the like. In such a configuration, one or more load control devices of the load control system, for example the controllable light source 110 and the plug-in load control device 130 of the lighting control system 100, may be configured to assume subservient roles to the master device, and the master device may be configured to observe and/or record present state information pertaining to the subservient load control devices of the load control system. The subservient load control devices may be configured to ignore change of state messages transmitted by the faceplate remote control device 120, and the master device may be configured to forward change of state messages received from the faceplate remote control device 120 to one or more of subservient load control devices, or may, upon receipt of one or more change of state messages from the faceplate remote control device 120, transmit appropriate command messages to one or more of subservient load control devices.

A load control system in which the faceplate remote control device 120 is deployed, for instance the lighting control system 100, need not include a central control entity, such as a master device. One or more load control devices that are associated with the lighting control system 100, such as the controllable light source 110 and/or the plug-in load control device 130, may be configured to be aware of present state information pertaining to one or more other load control devices of the lighting control system 100. For example, the controllable light source 110 may be configured to be aware of whether the light bulb 134 controlled by the plug-in load control device 130 is on or off. Similarly, the plug-in load control device 130 may be configured to be aware of whether the integral lighting load of the controllable light source 110 is on or off. In such a configuration, the controllable light source 110 and the plug-in load control device 130 may operate to ensure that the lighting loads of the lighting control system 100 are kept synchronized with one another, for example responsive to one or more change of state messages that are transmitted by the faceplate remote control device 120.

Alternative examples of state change devices are described in greater detail in commonly-assigned U.S. patent application Ser. No. 13/830,102, filed Mar. 14, 2013, entitled "State Change Devices For Switched Electrical Receptacles," the entire disclosure of which is incorporated herein by reference.

Figure 3A:
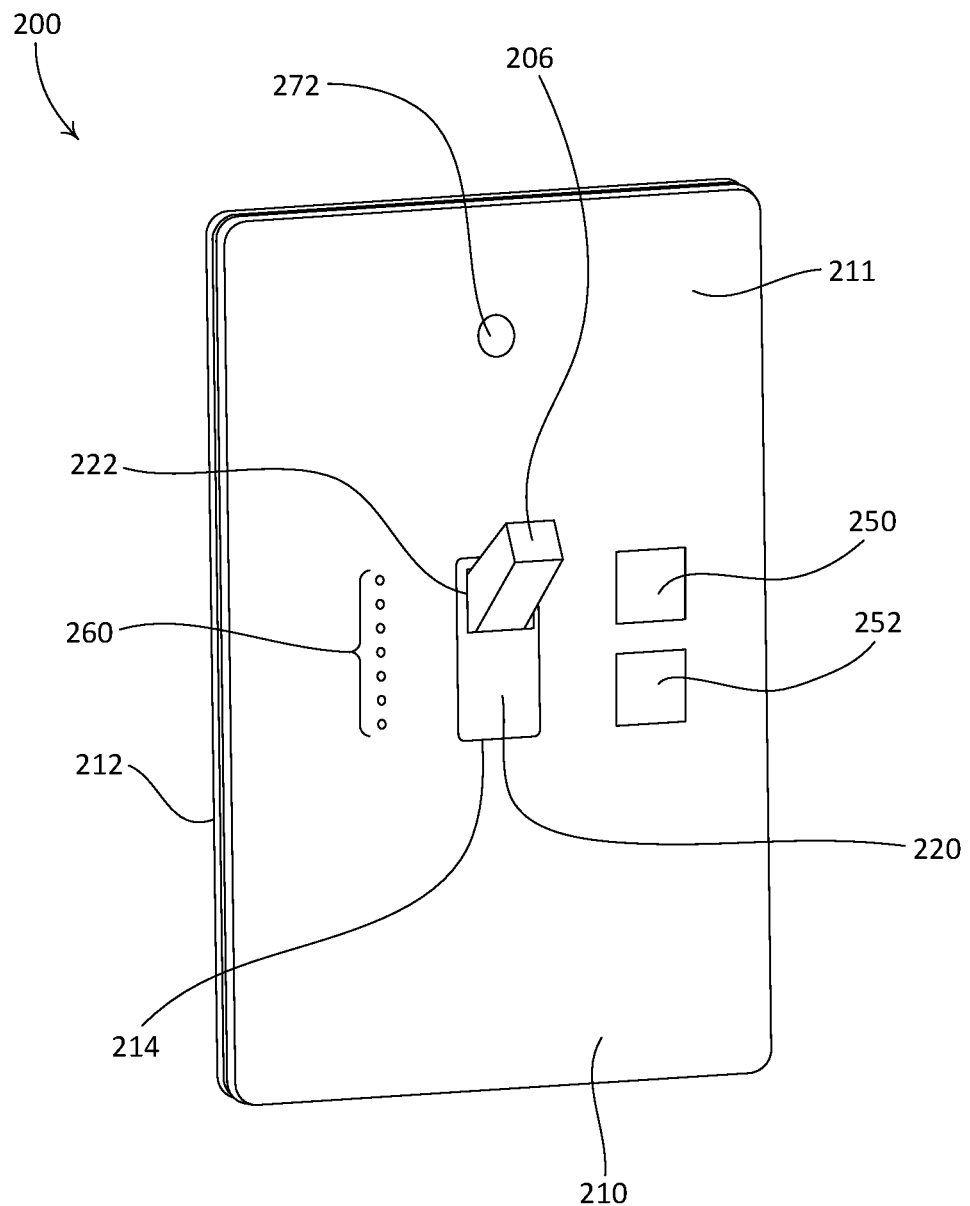
FIG. 3A is a perspective view of an example faceplate remote control device.
Figure 3B:
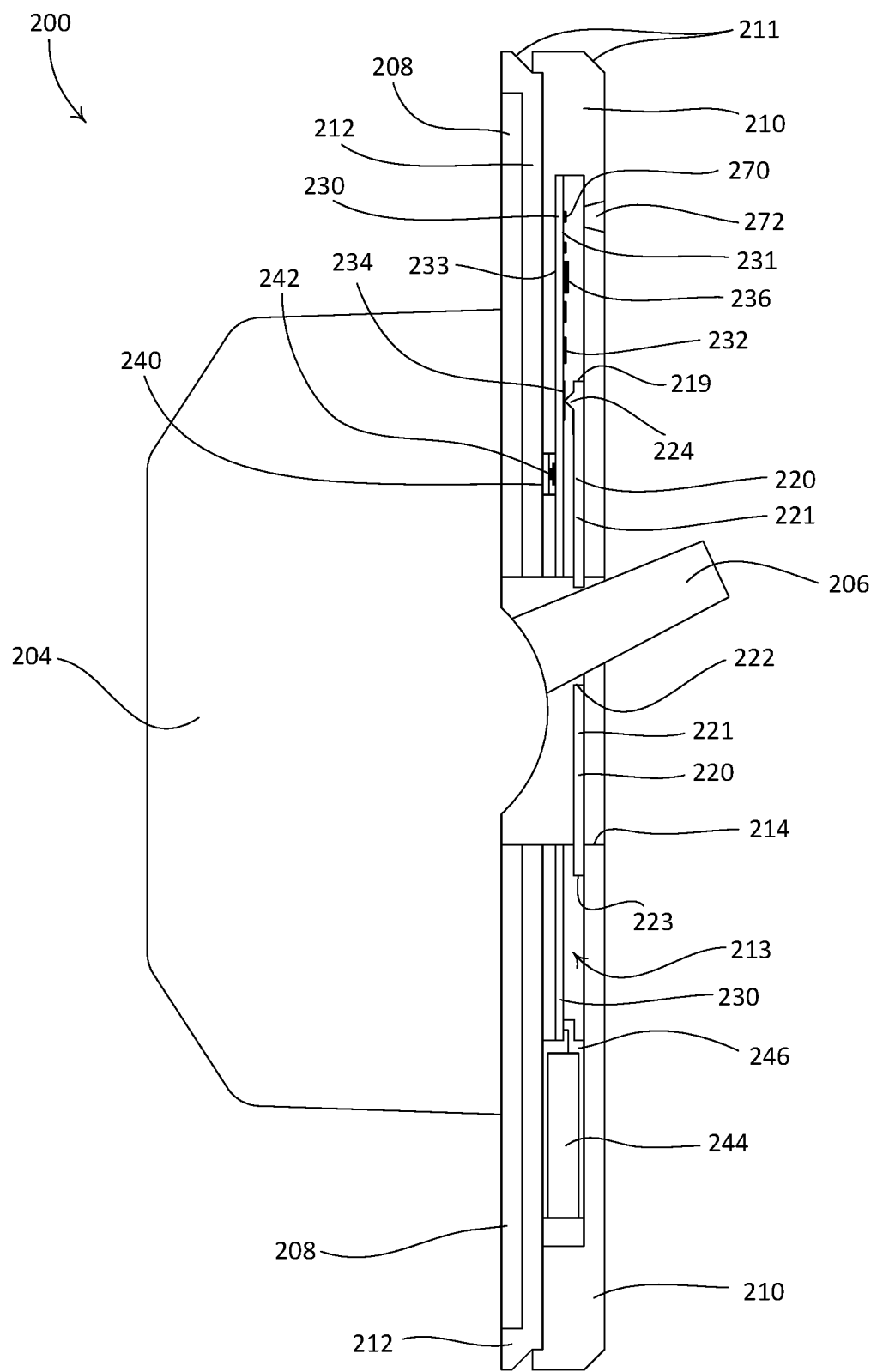
FIG. 3B is a cross-sectional view of the example faceplate remote control device depicted in FIG. 3A.

FIGS. 3A and 3B depict an example faceplate remote control device 200. The faceplate remote control device 200 may be implemented, for example, as the faceplate remote control device 120 of the lighting control system 100 shown in FIG. 2. FIG. 3B is a simplified left side cross-sectional view of the example faceplate remote control device 200, taken through the center of the faceplate remote control device 200. The faceplate remote control device 200 includes a housing 211 that is configured to be attached to (e.g., mounted to) a wall-mounted mechanical switch, such as a standard wall-mounted light switch. As shown, the faceplate remote control device 200 includes a two-part housing 211 that includes an adapter plate 212 that is configured to be mounted to a light switch (e.g., to a yoke of the light switch), and a front plate 210 that is adapted to be attached (e.g., semi-permanently attached) to the adapter plate 212. In an example configuration, the front plate 210 and the adapter plate 212 may define respective attachment members that allow the front plate 210 to be secured to the adapter plate 212. For example, the front plate 210 may define one or more resilient snap-fit connectors (not shown) that are designed to releasably engage within one or more complementary recesses (not shown) that are defined by the adapter plate 212. It should be appreciated that the front plate 210 and/or the adapter plate 212 may be otherwise configured to be attachable to one another. It should further be appreciated that the faceplate remote control device 200 is not limited to the illustrated two-part housing 211, and that the housing of the faceplate remote control device 200 may be alternatively configured, for instance as a one part housing. For example, the faceplate remote control device 200 may include a differently configured front plate (not shown) that defines one or more openings that are configured to receive fasteners (e.g., screws) so as to mount the faceplate remote control device 200 to a standard light switch.

As shown in FIGS. 3A and 3B, the faceplate remote control device 200 may be configured to be mounted to a standard wall-mounted mechanical switch 204 (e.g., the mechanical switch 104 of the lighting control system 100 shown in FIG. 2). The faceplate remote control device 200 may be configured to maintain free operation of a toggle actuator 206 of the mechanical switch 204 when the faceplate remote control device 200 is attached to the mechanical switch 204. For example, as shown, the housing 211 defines an opening 214. In accordance with the illustrated faceplate remote control device 200, the opening 214 is defined by the adapter plate 212 and the front plate 210. The opening 214 may be configured to permit the toggle actuator 206 of the mechanical switch 204 to protrude through the opening 214 such that the toggle actuator 206 is operable, for example between respective first and second positions that correspond to open and closed positions of the mechanical switch 204. The mechanical switch 204 may include a yoke 208 that allows the mechanical switch 204 to be mounted to a standard electrical wallbox, for instance using one or more mounting screws (not shown). The adapter plate 212 of the faceplate remote control device 200 may be configured to attach to the yoke 208 of the mechanical switch 204, for example via one or more attachment screws (not shown).

The faceplate remote control device 200 may include a toggle indicator 220 that is configured to move along with the toggle actuator 206. The toggle indicator 220 may be configured to generate one or more indications, for instance in response to operation of the toggle actuator 206. As shown, the faceplate remote control device 200 includes a toggle indicator that is implemented as a sliding member 221. The sliding member 221 may be configured to move along with the toggle actuator 206 when the toggle actuator 206 is operated.

As shown, the sliding member 221 may include a plate shaped body that defines a first end 219 that may be referred to as an upper end of the body, and an opposed second end 223 that is spaced from the first end 219, and that may be referred to as a lower end of the body. The body of the sliding member 221 may define a length, for example as defined from the first end 219 to the second end 223, such that the sliding member 221 at least partially covers the opening 214 as the toggle actuator is operated. For example, the sliding member 221 may be configured such that when the toggle actuator 206 is positioned in a first position that corresponds to a first limit of its travel (e.g., a fully up position as shown in FIGS. 3A and 3B), the second end 223 of the body is disposed below a lower edge of the opening 214, and such that when the toggle actuator 206 is positioned in a second position that corresponds to a second limit of its travel (e.g., a fully down position), the first end 219 of the body is disposed above an upper edge of the opening 214.

The sliding member 221 may be configured to captively attach to the toggle actuator 206 of the mechanical switch 204, such that the sliding member 221 moves along with the toggle actuator 206 when the toggle actuator 206 is operated. For example, as shown, the sliding member may define an aperture 222 that is configured to surround a portion of the toggle actuator 206, such as an outer perimeter of the toggle actuator 206. The housing 211 may define a cavity 213 within which the sliding member 221 may move relative to the housing 211 when the toggle actuator 206 is operated. In accordance with the illustrated faceplate remote control device 200, the cavity 213 is defined by the front plate 210 of the housing 211.

As shown, the sliding member 221 may be positioned adjacent to a rear surface of the front plate 210 when disposed in the cavity 213 (e.g., as shown in FIG. 3B). The sliding member 221 may be oriented in a plane that is parallel to an inner surface of the front plate 210, and may be configured to move along a longitudinal direction relative to the faceplate remote control device 200 (e.g., in an up and down with respect to the orientation of the faceplate remote control device 200 as shown in FIGS. 3A and 3B). As shown, the sliding member 221 may be configured such that the aperture 222 surrounds a portion of the exterior of the toggle actuator 206. The aperture 222 may be sized to be slightly larger than corresponding peripheral dimensions of the surrounded portion of the toggle actuator 206, such that the sliding member 221 moves with the toggle actuator 206 (e.g., along the longitudinal direction) as the toggle actuator 206 is operated.

The faceplate remote control device 200 may also include a printed circuit board (PCB) 230 that may be housed inside the front plate 210, for example disposed in the cavity 213. Electrical circuitry of the faceplate remote control device 200 may be mounted to the printed circuit board 230, and may include a control circuit, such as a microprocessor 232. The sliding member 221 may include a wiper 224 that may be operable to contact (e.g., to abut) a front surface of the printed circuit board 230 when the toggle actuator is in a first position (e.g., as shown in FIG. 3B). The wiper 224 may be electrically conductive, and may contact one or more conductive pads and/or surfaces of the printed circuit board 230, for example in accordance with a standard potentiometer configuration.

As the toggle actuator 206 of the mechanical switch 204 is operated, the sliding member 221 may move concurrently with the toggle actuator 206, along the longitudinal direction, which may cause the wiper 224 to move across a corresponding front surface 231 of the printed circuit board 230. For example, the front surface 231 of the printed circuit board 230 may include a conductive pad 234 that is communicatively coupled to (e.g., configured to transmit electrical signals to) the microprocessor 232. When the toggle actuator 206 is in a first position (e.g., as shown in FIGS. 3A and 3B), the wiper 224 may be electrically coupled to the conductive pad 234, and may generate a signal to the microprocessor 232 that the toggle actuator 206 is in the first position. In this regard, the sliding member 221 may be configured to cause the generation of a first indication when the toggle actuator 206 is operated into, and/or remains in, the first position.

When the toggle actuator 206 is operated to a second position, wherein the sliding member 221 moves along the longitudinal direction such that the wiper 224 is no longer electrically coupled to the conductive pad 234, the microprocessor 232 may be configured to determine that the toggle actuator 206 is no longer in the first position. The second position may correspond, for example, to a down position of the toggle actuator 206, or to an intermediate position between the up and down positions. In this regard, the sliding member 221 may be configured to cause the generation of a second indication when the toggle actuator 206 is operated out of the first position, or when the toggle actuator 206 is operated into the second position.

It should be appreciated that the printed circuit board 230 is not limited to the illustrated configuration having a single conductive pad 234. For example, the front surface 231 of the printed circuit board 203 may alternatively include two or more conductive pads 234, such that the wiper 224 may be electrically coupled to successive conductive pads 234 as the toggle actuator 206 is operated. In accordance with such a configuration, the microprocessor 232 may be configured to determine one or more intermediate or incremental positions of the toggle actuator 206 (e.g., between the up and down positions) as the toggle actuator 206 is operated. The faceplate remote control device 200 may alternatively include one or more mechanical tactile switches (not shown) that may be mounted to the printed circuit board 230 (e.g., to the front surface 231), and that may be actuated by the sliding member 221 when the toggle actuator 206 is in the up position or the down position.

The illustrated faceplate remote control device 200 may also include a wireless communication circuit 236. The wireless communication circuit 236 may include, for example, an RF transmitter integrated circuit that is mounted to printed circuit board 230, and an antenna (not shown). The antenna may comprise, for example, a loop antenna that is displaced on the printed circuit board 230. The microprocessor 232 may be configured to cause the wireless communication circuit 236 to transmit one or more messages (e.g., state change messages), for instance in response to operation of the toggle actuator 206. For example, a load control device that is associated with the faceplate remote control device 200 may be operable to control a corresponding electrical load (e.g., a lighting load) in response to one or more messages transmitted by the faceplate remote control device 200.

The microprocessor 232 may be configured to detect one or more predetermined patterns of operation of the toggle actuator 206. For example, the microprocessor 232 may be configured to detect one or more predetermined patterns of operation that comprise sequences of toggles of the toggle actuator 206. A sequence of toggles of the toggle actuator 206 may comprise, for example, operating the toggle actuator 206 a predetermined number of times between the first and second positions, between the first position and an intermediate position, between the second position and an intermediate position, between respective first and second intermediate positions, or the like. A sequence of toggles of the toggle actuator 206 may include one or more temporal components. For example, an amount of time during which the toggle actuator 206 is left in particular position (e.g., the first and/or second positions) may distinguish a first sequence of toggles from a second sequence of toggles. One or more predetermined patterns of operation of the toggle actuator 206 may be configured, for example, by a user of the faceplate remote control device 200.

Such predetermined patterns of operation of the toggle actuator 206 may be associated with desired functionality of one or more devices that are associated with the faceplate remote control device 200 in a lighting control system. For example, one or more predetermined patterns of operation of the toggle actuator 206 may be associated with the selection of corresponding lighting presets (e.g., lighting scenes) by a user of the faceplate remote control device 200. To illustrate, a first predetermined sequence of toggles of the toggle actuator 206 may be used to select a first preset, a second predetermined sequence of toggles of the toggle actuator 206 may be used to select a second preset, and so on. In another example, one or more predetermined patterns of operation of the toggle actuator 206 may be associated with the selection of a fade rate of a lighting load by the user of the faceplate remote control device 200. To illustrate, a first predetermined sequence of toggles of the toggle actuator 206 may be used to cause a lighting load to quickly turn on to full intensity, and a second predetermined sequence of toggles of the toggle actuator 206 may cause the lighting load to slowly fade to a lowest intensity (e.g., to off). Upon detecting a predetermined pattern of operation of the toggle actuator 206 that is associated with a selected lighting preset or a selected fade rate, the microprocessor 232 may cause the wireless communication circuit 236 to transmit one or more messages to one or more devices that are associated with the faceplate remote control device 200. The one or messages may include, for example, commands that cause one or more load control devices that are associated with the faceplate remote control device 200 to adjust the intensities of corresponding lighting loads in accordance with the selected lighting preset or fade rate.

As shown, the faceplate remote control device 200 further includes a programming button 240, which is mechanically coupled to a tactile switch 242 that is mounted to a rear surface 233 of the printed circuit board 230. One or more devices, such as a load control device, may be associated with the faceplate remote control device 200, for example in response to actuations of a button on the load control device and the programming button 240 of the faceplate remote control device 200. In this regard, the programming button 240 may be operated to initiate a process to associate the faceplate remote control device 200 with one or more devices, for instance one or more devices of a load control system, such as a lighting control system.

The faceplate remote control device 200 may further include a power source. The power source may include, for example, an energy storage device such as a coin cell battery 244. The faceplate remote control device 200 may further include a battery holder 246 that is configured to secure the battery 244 in position relative to the faceplate remote control device 200. As shown, the faceplate remote control device 200 may include a battery holder 246 that is located in the front plate 210. When disposed in the battery holder 246, the battery 244 may be electrically coupled to the printed circuit board 230, and may provide power to the microprocessor 232 and/or to the wireless communications circuit 236.

The faceplate remote control device 200 may include one or more other power sources, for instance in addition to, or in lieu of, the battery 244. For example, the faceplate remote control device 200 may include a solar cell or photovoltaic coating, such as a photovoltaic film, (not shown) that may be displaced on (e.g., attached to) one or more surfaces (e.g., exterior surfaces) of the housing 211 of the faceplate remote control device 200, such as on a front surface of the front plate 210. The photovoltaic coating may configured, for example, to charge the battery 244 or another energy storage device, such as a capacitor, and/or to directly power the microprocessor 232 and/or the wireless communication circuit 236. In another example, the faceplate remote control device 200 may include a kinetic power source (not shown) that is configured to power the microprocessor 232 and/or the wireless communication circuit 236. The kinetic power source may be configured to derive power from, for example, movements of the toggle actuator 206.

The faceplate remote control device 200 may define a user interface. The user interface may be configured to receive one or more inputs from a user of the faceplate remote control device 200. Such inputs may, for example, cause the faceplate remote control device 200 to issue commands to one or more devices that are associated with the faceplate remote control device 200. As shown in FIG. 3A, the faceplate remote control device 200 defines a user interface that may include one or more buttons, such as buttons 250, 252. The buttons 250, 252 may be configured to, upon actuation, cause the wireless communication circuit 236 to transmit one or more messages. The one or more messages may include, for example, one or more commands directed to one or more devices (e.g., load control devices such as lighting control devices) that are associated with the faceplate remote control device 200. Such messages may be referred to as command messages.

The one or more command messages may provide advanced control of a lighting load that is controlled by the load control device. To illustrate, in a lighting control system in which the faceplate remote control device 200 is associated with the controllable light source 110, one or more command messages transmitted in response to operation of one or more of the buttons 250, 252 may cause the integral load regulation circuit of the controllable light source 110 to raise and/or lower the intensity of the integral lighting load. In accordance with an alternative configuration of the faceplate remote control device 200, the buttons 250, 252 may be configured to cause the selection of associated lighting scenes or lighting presets of the lighting control system 100. The buttons 250, 252 may be mechanically coupled to corresponding mechanical tactile switches (not shown) that may be mounted to the printed circuit board 230. It should be appreciated that the user interface of the faceplate remote control device 200 is not limited to the illustrated mechanical buttons 250, 252. In an alternative configuration, the faceplate remote control device 200 may include a capacitive or resistive touch display (not shown), and the user interface may include one or more graphical representations of controls (e.g., soft buttons) exhibited (e.g., displayed) on the touch display.

As shown, the faceplate remote control device 200 may further include a visual display, such as a linear array of visual indicators 260 that may be illuminated to provide feedback, for instance feedback related to an intensity of a lighting load that is controlled by a load control that is associated with the faceplate remote control device 200. The visual indicators 260 of the linear array may be illuminated, for example, by light-emitting diodes (not shown) that are mounted on the printed circuit board 230. Circuits for efficiently illuminating one or more light-emitting diodes are described in greater detail in commonly-assigned U.S. patent application publication no. 2012/0286940, published Nov. 12, 2012, entitled "Control Device Having A Nightlight," the entire disclosure of which is incorporated herein by reference. In an alternative configuration, the visual indicators of the faceplate remote control device 200 may be displayed on a capacitive or resistive touch display (not shown), such as a display that exhibits one or more soft buttons of a user interface of the faceplate remote control device 200.

The faceplate remote control device 200 may further include a sensing device 270 that is configured to provide automated control of a lighting load that is controlled by a load control device that is associated with the faceplate remote control device 200. The sensing device 270 may be mounted to the printed circuit board 230, for example, and the microprocessor 232 may be configured to cause the wireless communication circuit 236 to transmit one or more messages to the load control device in response to the sensing device 270. For example, the sensing device 270 may be an occupancy or vacancy sensing device, such that the microprocessor 232 may be configured to cause one or more messages to be transmitted to the load control device in response to the sensing device 270 detecting an occupancy or vacancy condition in a space around the faceplate remote control device 200. The sensing device 270 may comprise, for example, a passive infrared (PIR) detector that is operable to receive infrared energy through a lens 272 located in the front plate 210 of the housing 211 of the faceplate remote control device 200. Alternatively, the sensing device 270 may comprise an ultrasonic detector, a microwave detector, or any combination of passive infrared, ultrasonic, and/or microwave detectors. The load control device may turn the controlled lighting load on and off in response to the sensing device 270 of the faceplate remote control device 200 detecting occupancy and/or vacancy conditions, for example in a similar manner as the controllable light source 110 and/or the plug-in load control device 130 operate in response to messages received form the occupancy sensor 150, as described herein.

The sensing device 270 may alternatively comprise a daylight sensing device that is configured to measure a light level in a space surrounding the faceplate remote control device 200. The microprocessor 232 may be configured to cause the wireless communication circuit 236 to transmit one or more messages, for example including one or more light level measurements, to a load control device that is associated with the faceplate remote control device 200. The one or more messages may be received by the load control device, and the load control device, responsive to receipt of the one or more messages, may adjust an intensity of a corresponding lighting load that is controlled by the load control device. The sensing device 270 may alternatively comprise a temperature sensing device that is configured to measure a temperature of a space surrounding the faceplate remote control device 200. It should be appreciated that the faceplate remote control device 200 may include other types of sensing devices, or any combination of occupancy or vacancy sensing devices, daylight sensing devices, and/or temperature sensing devices.

It should be appreciated that while the faceplate remote control device 200 is illustrated in accordance with a single-gang configuration in FIGS. 3A and 3B, that the faceplate remote control device 200 may alternatively be configured in accordance with a multi-gang faceplate structure. For example, the faceplate remote control device may alternatively be configured to include two openings for receiving respective toggle actuators of two mechanical switches. In accordance with such a configuration, the faceplate remote control device may be configured to determine the respective positions of each toggle actuator, and to transmit one or more wireless messages in response to the positions of one or both of the toggle actuators. Alternatively, such a configuration of the faceplate remote control device may be configured to determine the position of a single one of the toggle actuators.

Figure 4A:
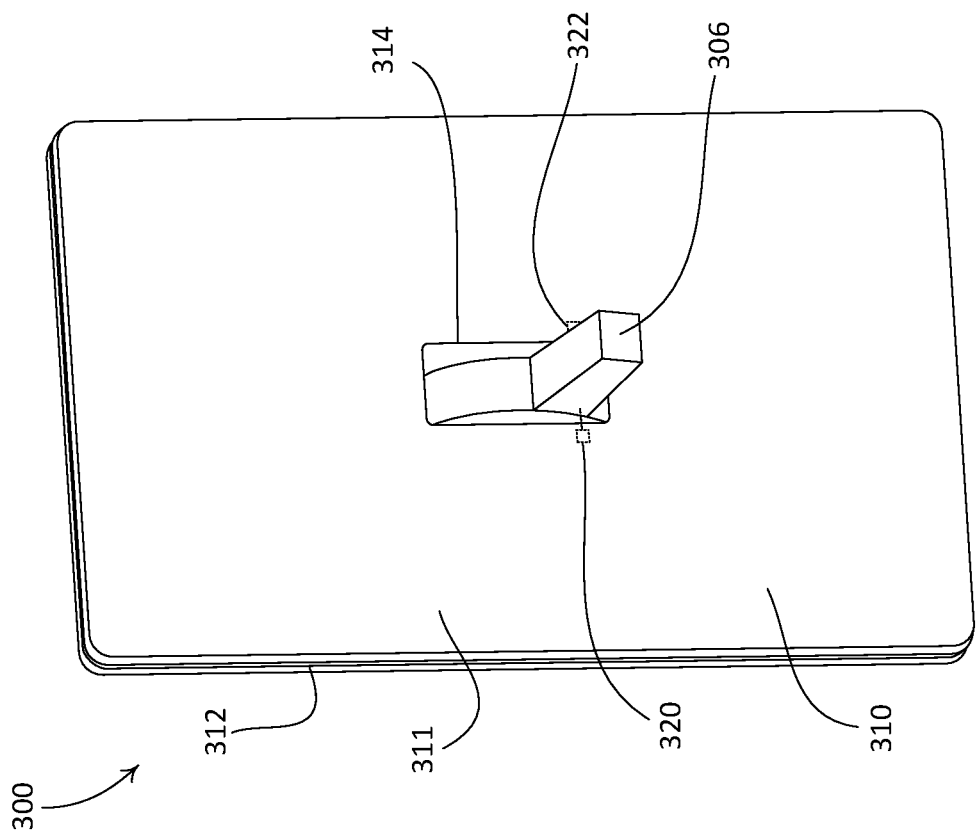
FIGS. 4A and 4B are perspective views of another example faceplate remote control device.
Figure 4B:
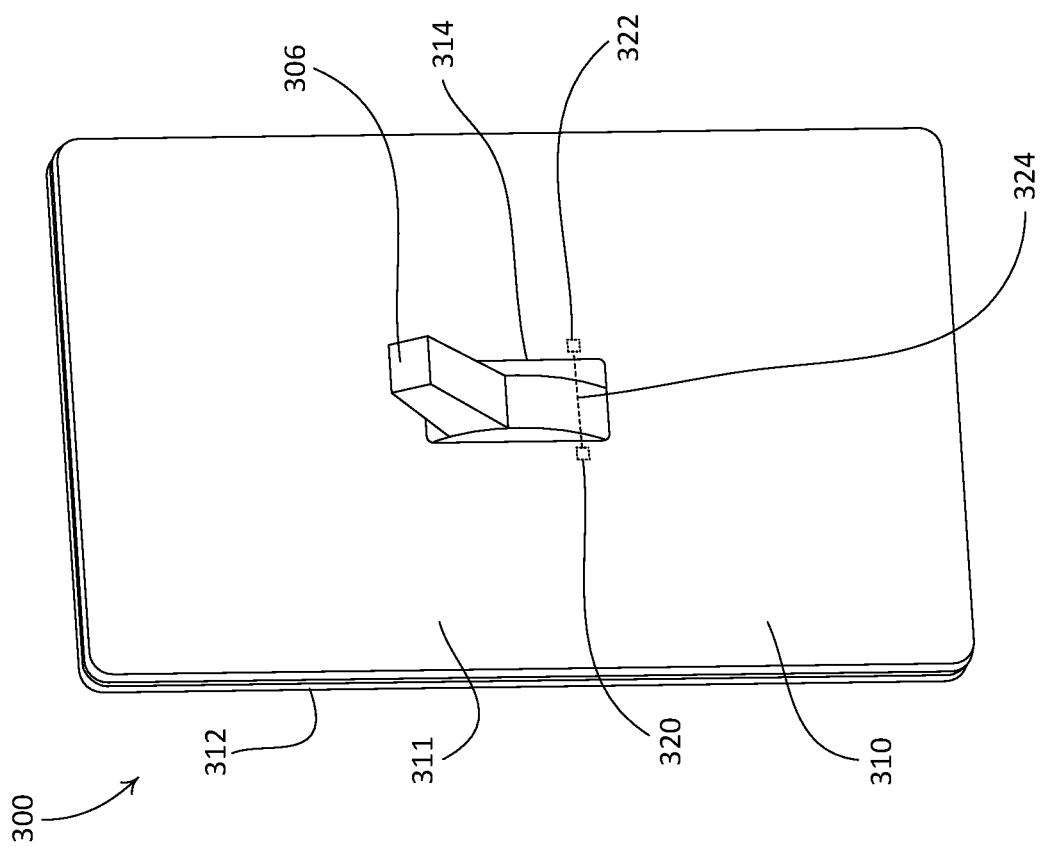

FIGS. 4A and 4B depict another example faceplate remote control device 300. The faceplate remote control device 300 may be implemented, for example, as the faceplate remote control device 120 of the lighting control system 100 shown in FIG. 2. The faceplate remote control device 300 includes a housing 311 that is configured to be attached to (e.g., mounted to) a wall-mounted mechanical switch, such as a standard wall-mounted light switch. As shown, the faceplate remote control device 300 includes a two-part housing 311 that includes an adapter plate 312 that is configured to be mounted to a light switch (e.g., to a yoke of the light switch), and a front plate 310 that is adapted to be attached (e.g., semi-permanently attached) to the adapter plate 312. In an example configuration, the front plate 310 and the adapter plate 312 may define respective attachment members that allow the front plate 310 to be secured to the adapter plate 312. For example, the front plate 310 may define one or more resilient snap-fit connectors (not shown) that are designed to releasably engage within one or more complementary recesses (not shown) that are defined by the adapter plate 312. It should be appreciated that the front plate 310 and/or the adapter plate 312 may be otherwise configured to be attachable to one another.

The faceplate remote control device 300 may be configured to be mounted to a standard wall-mounted mechanical switch (e.g., the mechanical switch 104 of the lighting control system 100 shown in FIG. 2). The faceplate remote control device 300 may be configured to maintain free operation of a toggle actuator 306 of the mechanical switch when the faceplate remote control device 300 is attached to the mechanical switch. For example, as shown, the housing 311 defines an opening 314. The opening 314 may be configured to permit the toggle actuator 306 of the mechanical switch to protrude through the opening 314 such that the toggle actuator 306 is operable, for example between respective first and second positions that correspond to open and closed positions of the mechanical switch. The mechanical switch may include a yoke that allows the mechanical switch to be mounted to a standard electrical wallbox, for instance using one or more mounting screws (not shown). The adapter plate 312 of the faceplate remote control device 300 may be configured to attach to the yoke of the mechanical switch, for example via one or more attachment screws (not shown).

The faceplate remote control device 300 may include a toggle indicator that is configured to generate one or more indications, for instance in response to operation of the toggle actuator 306. As shown, the faceplate remote control device 300 includes a toggle indicator that is implemented as an obstruction detection device comprising an infrared (IR) transmitter 320 and an IR receiver 322. The IR transmitter 320 and the IR receiver 322 may be disposed on opposed sides of the opening 314, for instance mounted inside the front plate 310 on opposite sides of the opening 314. As shown, the IR transmitter 320 may be disposed near a first side of the opening 314, and the IR receiver 322 may be disposed near a second side of the opening 314 that is opposite the first side of the opening 314.

The IR transmitter 320 may be configured to emit an IR beam 324, and the IR receiver 322 may be configured to receive the IR beam 324, when the toggle actuator 306 is in a first position, such as an up position as shown in FIG. 4A. When the toggle actuator 306 is operated into a second position, such as a down position of the toggle actuator 306, the IR beam 324 may be obstructed, such that reception of the IR beam 324 by the IR receiver 322 is interrupted. The IR receiver 322 may generate a control signal that is representative of whether the IR receiver 322 receives the IR beam 324. The control signal may thus be representative of the position of the toggle actuator 306, and may comprise an indication of when the toggle actuator 306 is operated. The faceplate remote control device 300 may further include a control circuit (not shown) that is configured to determine the position of the toggle actuator 306 in response to the control signal generated by the IR receiver 322. The faceplate remote control device 300 may further include a wireless communication circuit (not shown). The control circuit may be configured to cause the wireless communication circuit to transmit one or more messages in response to the position of the toggle actuator 306. It should be appreciated that the faceplate remote control device 300 is not limited to the illustrated obstruction detection device. For example, the obstruction detection device may alternatively comprise magnetic, fiber optic, or other proximity detection techniques to detect the position of the toggle actuator 306.

Figure 5:
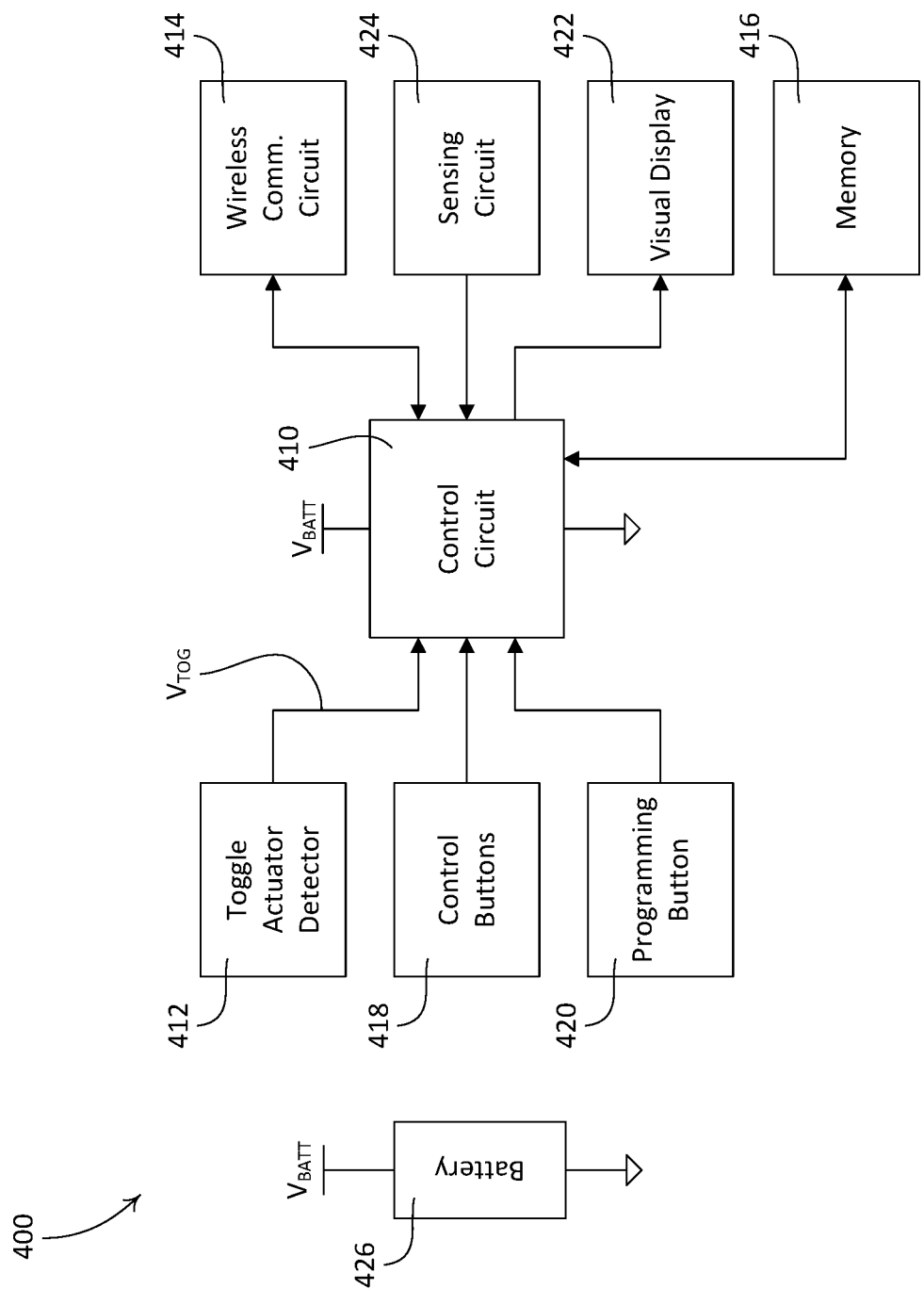
FIG. 5 is a simplified block diagram of an example faceplate remote control device.

FIG. 5 is a simplified block diagram of an example faceplate remote control device 400. The faceplate remote control device 400 may be implemented, for example, as the faceplate remote control device 120 of the lighting control system 100 shown in FIG. 2, as the faceplate remote control device 200 shown in FIGS. 3A and 3B, and/or as the faceplate remote control device 300 shown in FIGS. 4A and 4B. The faceplate remote control device 400 may include a control circuit 410. The control circuit 410 may include one or more of a processor (e.g., a microprocessor), a microcontroller, a programmable logic device (PLD), a field programmable gate array (FPGA), an application specific integrated circuit (ASIC), or any suitable processing device. The faceplate remote control device 400 may be mounted to a standard wall-mounted mechanical switch. The control circuit 410 may be configured to detect the position of a toggle actuator of the mechanical switch.

The faceplate remote control device 400 may comprise a toggle actuator detector circuit 412 that is communicatively coupled to the control circuit 410 and that is configured to generate a toggle actuator control signal $V_{TOG}$ that is representative of the position of the toggle actuator of the mechanical switch. The toggle actuator control signal $V_{TOG}$ may be received by the control circuit 410, and may comprise an indication of when the toggle actuator of the mechanical switch is operated. The toggle actuator detector circuit 412 may be implemented as, for example, the wiper 224 of the sliding member 221 and the conductive pad 234 on the printed circuit board 230 of the faceplate remote control device 200, as a mechanical tactile switch (not shown) that could be mounted to the printed circuit board 230 and that could be actuated by the sliding member 221, and/or as the IR transmitter 320 and the IR receiver 322 of the faceplate remote control device 300. The control circuit 410 may be configured to determine the position of the toggle actuator of the mechanical switch in response to the toggle actuator control signal $V_{TOG}$.

The faceplate remote control device 400 may further include a wireless communication circuit 414 that is communicatively coupled to the control circuit 410. The wireless communication circuit 414 may include, for example, an RF transmitter that is coupled to an antenna for transmitting RF signals. The control circuit 410 may be configured to cause the wireless communication circuit 414 to transmit one or more messages (e.g., via RF signals) in response to the position of the toggle actuator of the mechanical switch determined from the toggle actuator control signal $V_{TOG}$. Alternatively, the wireless communication circuit 414 may include an RF receiver for receiving RF signals, an RF transceiver for transmitting and receiving RF signals, or an infrared (IR) transmitter for transmitter IR signals. For example, the control circuit 410 may be configured to receive one or more messages, via the wireless communication circuit 414, which may include for example, an amount of power being delivered to an electrical load that is controlled by a load control device that is associated with the faceplate remote control device 400.

The control circuit 410 may be configured to detect one or more predetermined patterns of operation of the toggle actuator of the mechanical switch, for instance as described herein. For example, the control circuit 410 may be configured to detect a predetermined pattern of operation that comprises one or more toggles of the toggle actuator between the first and second positions a predetermined number of times, for instance within a predetermined interval of time. Such predetermined patterns of operation of the toggle actuator may be associated with desired functionality of one or more devices that are associated with the faceplate remote control device 400 in a lighting control system. For example, one or more predetermined patterns of operation of the toggle actuator may be associated with the selection of corresponding lighting presets (e.g., lighting scenes) by a user of the faceplate remote control device 400. Upon detecting a predetermined pattern of operation of the toggle actuator that is associated with a selected lighting preset, the control circuit 410 may cause the wireless communication circuit 414 to transmit one or more messages to one or more devices that are associated with the faceplate remote control device 400. The one or messages may include, for example, commands that cause one or more load control devices that are associated with the faceplate remote control device 400 to adjust the intensities of corresponding lighting loads in accordance with the selected lighting preset.

The faceplate remote control device 400 may further include a memory 416. The memory 416 may be communicatively coupled to the control circuit 410, and may operate to store information, such as one or more lighting presets that may be associated with predetermined patterns of operation of the toggle actuator of the mechanical switch. The control circuit 410 may be configured to store such information in, and/or to retrieve such information from, the memory 416. The memory 416 may include any component suitable for storing such information. For example, the memory 416 may include one or more components of volatile and/or non-volatile memory, in any combination. The memory 416 may be internal and/or external with respect to the control circuit 410. For example, the memory 416 may be implemented as an external integrated circuit (IC), or as an internal circuit of the control circuit 410 (e.g., integrated within a microchip).

The faceplate remote control device 400 may further include one or more buttons, such as one or more control buttons 418 and/or a programming button 420 that are communicatively coupled to the control circuit 410, for instance such that the control circuit 410 may receive respective inputs from the one or more control buttons 418 and the programming button 420. The faceplate remote control device 400 may further include a visual display 422 that is configured to provide feedback, for example of the amount of power being delivered to the electrical load being controlled by the load control device that is associated with the faceplate remote control device 400. The visual display 422 may comprise, for example, one or more light emitting diodes (LEDs) illuminating a linear array of visual indicators on the faceplate remote control device 400. The faceplate remote control device 400 may further include a sensing circuit 424 that comprises a sensing device. The sensing circuit 424 may be configured to provide automated control of the lighting load that is controlled by the load control device that is associated with the faceplate remote control device 400. For example, the sensing circuit 424 may comprise an occupancy sensing circuit or a daylight sensing circuit (e.g., similar to the sensing device 270 of the faceplate remote control device 200 shown in FIGS. 3A and 3B). The faceplate remote control device 400 may further include an energy storage device, such as a battery 426 (e.g., a coin cell battery). The battery 426 may be configured to provide power to the control circuit 410, the wireless communication circuit 414, and/or to other low voltage circuitry of the faceplate remote control device 400.

Figure 6:
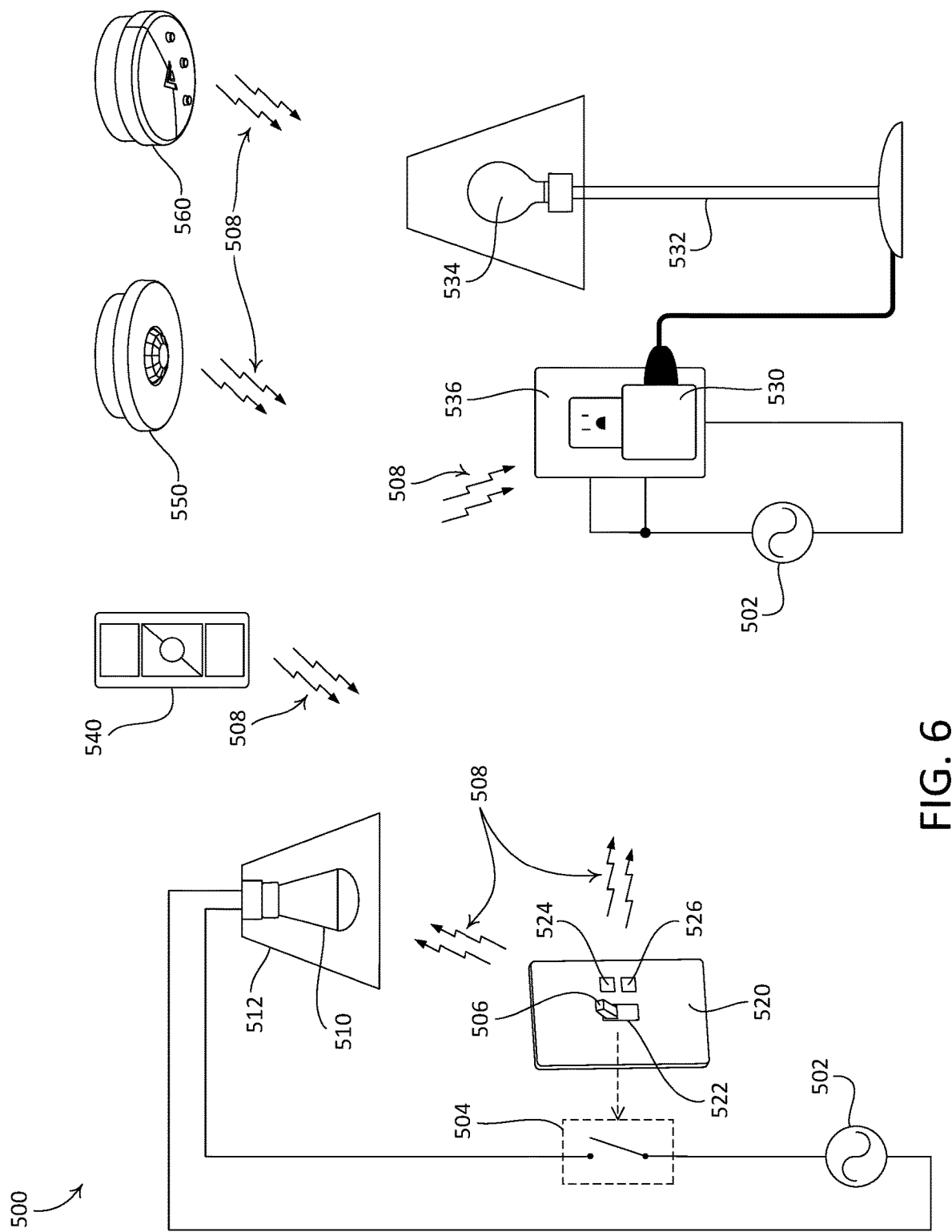
FIG. 6 depicts another example lighting control system that includes another example faceplate remote control device.

FIG. 6 depicts another example load control system that is configured as a lighting control system 500. The lighting control system 500 may include various components that are associated with each other, and that are configured to communicate with one another, for instance via wireless communication. As shown, the lighting control system 500 includes a controllable light source 510 and a faceplate remote control device 520 that may be configured to control the controllable light source 510. The controllable light source 510 and the faceplate remote control device 520 may include respective wireless communication circuits. For example, the controllable light source 510 may include a radio frequency (RF) transmitter, and the faceplate remote control device 520 may include an RF transceiver. The controllable light source 510 may be associated with the faceplate remote control device 520 during a configuration procedure of the lighting control system 500, such that the controllable light source 510 may be configured to respond to one or more messages transmitted by the faceplate remote control device 520.

The controllable light source 510 may include an integral lighting load (not shown) and an integral load regulation circuit (not shown). The integral lighting load of the controllable light source 510 may comprise, for example, an incandescent lamp, a halogen lamp, a compact fluorescent lamp, a light-emitting diode (LED) light engine, or other suitable light source. The integral load regulation circuit of the controllable light source 510 may comprise, for example, a dimmer circuit, a ballast circuit, or an LED driver circuit, for controlling the intensity of the integral lighting load between a low-end intensity (e.g., approximately 1%) and a high-end intensity (e.g., approximately 100%). The faceplate remote control device 520 may be associated with the controllable light source 510, such that the faceplate remote control device 520 may be operated to cause the integral load regulation circuit to control the integral lighting load. The controllable light source 510 may be installed in a ceiling-mounted downlight fixture 512.

As shown, the downlight fixture 512 may be coupled to an AC power source 502 through a standard wall-mounted mechanical switch 504 (e.g., a toggle switch or a standard light switch). The mechanical switch 504 may include a toggle actuator 506. The mechanical switch 504 may be opened and closed in response to actuations of (e.g., operation of) the toggle actuator 506. Accordingly, the controllable light source 510 may be turned on and/or off in response to actuations of the toggle actuator 506 of the mechanical switch 504.

The controllable light source 510 may further include a control circuit (e.g., microprocessor) and a wireless communication circuit (e.g., comprising an RF receiver) that may be housed inside an enclosure portion of the controllable light source 510. The control circuit may be configured to control the integral lighting load in response to one or more messages that are received at the wireless communication circuit (e.g., via RF signals 508), such as messages received from the faceplate remote control device 520. The controllable light source 510 may be configured similarly to the controllable light source 110 shown in FIG. 2, for example comprising a similar mechanical assembly and/or including similar electrical circuitry as.

The faceplate remote control device 520 may be configured to be attached to (e.g., mounted to) the mechanical switch 504. For example, the faceplate remote control device 520 may be attached to the mechanical switch 504 in place of a standard faceplate or wall plate. In this regard, the faceplate remote control device 520 may replace a standard faceplate or wall plate that was previously attached to the mechanical switch 504. The faceplate remote control device 520 may define an opening 522 through which the toggle actuator 506 of the mechanical switch 504 may protrude. As shown, the opening 522 is configured to permit the toggle actuator 506 to protrude through the opening 522 such that the toggle actuator 506 is operable, for example by a user of the lighting control system 500, and in particular a user of the faceplate remote control device 520.

As shown, the faceplate remote control device 520 may include one or more buttons, such as buttons 524, 526. The one or more buttons 524, 526 may be configured to cause the wireless communication circuit of the faceplate remote control device 520 to transmit one or more messages. The one or more messages may be, for example, command messages that are transmitted to a device that is associated with the faceplate remote control device 520, such as the controllable light source 510. One or more of the buttons 524, 526 may be operated, for example, to cause the controllable light source 510 to adjust the intensity of the integral lighting load, for instance when the mechanical switch 504 is closed. To illustrate, the faceplate remote control device 520 may be configured to transmit one or more messages (e.g., command messages), for example via RF signals 508, to the controllable light source 510 in response to operation of one or more of the buttons 524, 526.

The faceplate remote control device 520 may be configured to operate as a state change device. For example, the faceplate remote control device 520 may be configured to transmit one or more messages, for example via RF signals 508, in response to actuations of the toggle actuator 506 of the mechanical switch 504. The one or more messages may be indicative of a change of state within the lighting control system 500. For example, one or more messages may be indicative of a change of state of the toggle actuator 506 of the mechanical switch 504. Such messages may be referred to as change of state messages, or as change of state signals, and may be interpreted by one or more devices that are associated with the faceplate remote control device 520, such as the controllable light source 510, as indications (e.g., commands) to turn on, turn off, dim, etc. respective lighting loads.

The lighting control system 500 may further include another load control device. For example, as shown, the lighting control system 500 further includes a plug-in load control device 530. The plug-in load control device 530 is plugged into an electrical outlet 536 that has two unswitched receptacles that are in electrical communication with the AC power source 502. The lighting control system 500 further includes a floor lamp 532. A standard light bulb 534 is installed in the floor lamp 532. The floor lamp 532 is plugged into the plug-in load control device 530, such that the plug-in load control device 530 may be operated to adjust the intensity of the light bulb 534 between a low end intensity (e.g., approximately 1%) and a high-end intensity (e.g., approximately 100%).

The plug-in load control device 530 may be associated with, and may be controlled by, the faceplate remote control device 520. For example, the plug-in load control device 530 may cause the light bulb 534 to turn on or off in response to the receipt of one or more messages transmitted by the faceplate remote control device 520 (e.g., via RF signals 508). This may allow the intensity of the light bulb 534 to be synchronized with that of the controllable light source 510, for example. The plug-in load control device 530 may be configured to adjust the intensity of the light bulb 534, for instance in response to one or more messages transmitted by the faceplate remote control device 520 in response to operation of one or more of the buttons 524, 526. The plug-in load control device 530 may include one or more buttons (not shown) that are configured to provide local control of the plug-in load control device 530, for example to allow adjustment of the intensity of the light bulb 534. Alternatively, the plug-in load control device 530 may comprise a tabletop load control device or a wall-mounted dimmer switch.

The lighting control system 500 may further include one or more other devices that are configured to transmit messages (e.g., via RF signals 508) that may cause one or more load control devices of the lighting control system 500 to adjust corresponding lighting loads. For example, as shown, the lighting control system 500 further includes a battery-powered handheld remote control device 540, an occupancy sensor 550, and a daylight sensor 560 that may be configured to operate similarly to the battery-powered handheld remote control device 140, the occupancy sensor 150, and the daylight sensor 160, respectively, of the lighting control system 100 shown in FIG. 2. The controllable light source 510 may be configured to control the intensity of the integral lighting load in response to one or more messages received from the handheld remote control device 540, the occupancy sensor 550, and/or the daylight sensor 560, when the mechanical switch 504 is closed. The plug-in load control device 530 may be configured to control the intensity of the light bulb 534 in response to one or more messages received from the handheld remote control device 540, the occupancy sensor 550, and/or the daylight sensor 560, while the plug-in load control device 530 is plugged into the electrical outlet 536.

It should be appreciated that while the lighting control systems 100, 500 illustrated in FIGS. 2 and 6, respectively, are described herein with reference to single-pole AC systems, that the apparatuses, features, and/or techniques described herein may be implemented in a three-way lighting system having two single-pole double-throw (SPDT) mechanical switches (e.g., standard three-way switches), to control a single electrical load. For example, a lighting control system in accordance with such a configuration may include two faceplate remote control devices, with one faceplate remote control device mounted to each SPDT switch. Moreover, the apparatuses, features, and/or techniques described herein may be implemented in a four-way lighting system, or in a lighting system having more control locations. Additionally, the apparatuses, features, and/or techniques described herein may be applied to direct-current (DC) distribution systems.

It should further be appreciated that the apparatuses, features, and/or techniques described herein are not limited to implementation in a faceplate remote control device that is configured to be mounted to a mechanical switch that is mounted in a wallbox. For example, one or more components of the faceplate remote control device may be integrated into a mechanical switch. Such a configuration may comprise a remote control switch device that may be deployed as a replacement for an existing wall-mounted mechanical switch, for instance. For example, the remote control switch device may include an integral wireless communication circuit, and may be associated with one or more devices of a load control system, such as a load control device of a lighting control system. The remote control switch device may be configured to operate similarly to the faceplate remote control devices described herein. For example, the remote control switch device may be configured to transmit one or more messages (e.g., commands and/or change of state signals) to one or more devices that are associated with the remote control switch device, in response to operation of the toggle actuator of the remote control switch device. Such a remote control device may be configured, for example, with a standard toggle actuator, or with a Decora® or designer style toggle actuator.

The invention claimed is:

1. A lighting control system comprising:
    a lighting control device configured to control an amount of power to a lighting load; and
    a remote control device configured to be mounted over a wall-mounted light switch, the remote control device comprising:
        a housing that defines an opening, wherein an actuator of the wall mounted light switch is configured to protrude through the opening;
        a user interface integrated with the housing, wherein the user interface is configured to receive an input from a user of the remote control device;
        a control circuit configured to detect an operation of the actuator of the wall-mounted light switch; and
        a wireless communication circuit configured to transmit a message to the lighting control device in response to one of: the detection of the operation of the actuator or receiving the input at the user interface.

2. The lighting control system of claim 1, wherein the wireless communication circuit is configured to transmit the message to the lighting control device in response to receiving the input at the user interface, wherein the message comprises a command to adjust an intensity of the lighting load.

3. The lighting control system of claim 2, wherein the lighting control device is configured to adjust the intensity of the lighting load by at least one of raising or lowering the intensity based on the command.

4. The lighting control system of claim 2, wherein the user interface comprises a button, further wherein the input is an actuation of the button.

5. The lighting control system of claim 2, wherein the user interface comprises a capacitive touch display.

6. The lighting control system of claim 2, wherein the remote control device further comprises one or more visual indicators.

7. The lighting control system of claim 6, wherein the one or more visual indicators comprise a linear array of LEDs configured to represent the intensity of the lighting load.

8. The lighting control system of claim 1, wherein the housing of the remote control device further defines a cavity, and wherein the remote control device further comprises:
    a sliding member that moves within the cavity when the actuator of the wall-mounted light switch is operated; and
    wherein the sliding member is configured to cause the generation of a first indication when the actuator of the wall-mounted light switch is operated into a first position.

9. The lighting control system of claim 8, wherein the sliding member defines an aperture that is configured to surround a portion of the actuator of the wall-mounted light switch.

10. The lighting control system of claim 9, wherein the remote control device further comprises a conductive pad disposed in the cavity, wherein the sliding member includes an electrically-conductive wiper that is configured to abut the conductive pad when actuator of the wall-mounted light switch is operated into the first position.

11. The lighting control system of claim 9, wherein the remote control device further comprises a mechanical tactile switch disposed in the cavity, wherein the sliding member is configured to actuate the mechanical tactile switch when the actuator of the wall-mounted light switch is in the first position.

12. The lighting control system of claim 1, wherein the actuator of the wall-mounted light switch comprises a mechanical toggle actuator.

13. The lighting control system of claim 1, wherein the lighting load comprises a lamp, further wherein the lighting control device comprises a dimmer switch configured to be plugged into a receptacle of an electrical outlet and further configured to receive a plug of a lamp, wherein the lighting control device is configured to control the amount of power to the lamp.

14. The lighting control system of claim 1, wherein the lighting control device comprises a controllable light source, and the lighting load comprises a light emitting diode (LED).

15. The lighting control system of claim 14, wherein the controllable light source comprises a wireless transceiver.

* * * * *